(12) United States Patent
Ohara

(10) Patent No.: US 9,682,482 B2
(45) Date of Patent: Jun. 20, 2017

(54) AUTONOMOUS MOVING DEVICE AND CONTROL METHOD OF AUTONOMOUS MOVING DEVICE

(71) Applicant: HONDA MOTOR CO., LTD., Tokyo (JP)

(72) Inventor: Yoshihisa Ohara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/078,726

(22) Filed: Mar. 23, 2016

(65) Prior Publication Data

US 2016/0299505 A1 Oct. 13, 2016

(30) Foreign Application Priority Data

Apr. 9, 2015 (JP) ................................. 2015-080337

(51) Int. Cl.
*B25J 11/00* (2006.01)

(52) U.S. Cl.
CPC ................................. *B25J 11/0005* (2013.01)

(58) Field of Classification Search
CPC ............ G05D 1/0088; G06K 9/00355; G06K 9/00771; G06T 7/004; G06T 7/20; G06T 2207/10004; G06T 2207/30196; G06T 7/0042; G06T 2207/10028
See application file for complete search history.

(56) References Cited

U.S. PATENT DOCUMENTS

2005/0222712 A1\* 10/2005 Orita ....................... G10L 15/26
700/246
2015/0190927 A1\* 7/2015 Sutherland ............. B25J 9/1689
700/259

FOREIGN PATENT DOCUMENTS

| JP | 2006015433 A | \* | 1/2006 |
| JP | 2006123102 A | \* | 5/2006 |
| JP | 2006231497 A | \* | 9/2006 |
| JP | 2009-248193 | | 10/2009 |
| JP | 2009-285818 | | 12/2009 |

\* cited by examiner

*Primary Examiner* — Rodney Butler
(74) *Attorney, Agent, or Firm* — Rankin, Hill & Clark LLP

(57) ABSTRACT

An autonomous moving device includes: a measuring unit configured to measure a position and a posture of a person who is present in a predetermined area; an attention state estimating unit configured to estimate a first attention state of the person on the basis of information indicating the position and the posture of the person measured by the measuring unit; a state analyzing unit configured to determine a corrective course of action for correcting the first attention state on the basis of the estimated first attention state and a predetermined second attention state; and an action planning unit configured to determine an action corresponding to the determined correction course.

16 Claims, 29 Drawing Sheets

FIG. 3

| NAME OF OBJECT | POSITION INFORMATION OF OBJECT |
|---|---|
| SCREEN | (x11, y11, z11)、(x13, y11, z11)、(x11, y11, z13)、(x13, y11, z13)、(x12, y11, z12) |
| OBJECT ON EXHIBITION | (x21, y21, z21)、(x23, y21, z21)、(x21, y21, z23)、(x23, y21, z23)、(x22, y21, z22) |
| ROBOT | (x31, y31, z31)、(x33, y31, z31)、(x31, y31, z33)、(x33, y31, z33)、(x32, y31, z32) |

FIG. 4

| IDENTIFIER | POSITION INFORMATION IN x-y PLANE | DIRECTION INFORMATION OF PERSON | GAZE DIRECTION INFORMATION | HEIGHT INFORMATION | TOTAL NUMBER OF PERSONS |
|---|---|---|---|---|---|
| 1 | (x41, y41) | A1-1 | V-1 | z41 | |
| 2 | (x42, y42) | A1-2 | V-2 | z42 | |
| 3 | (x43, y43) | A1-3 | V-3 | z43 | N |
| 4 | (x44, y44) | A1-4 | V-4 | z44 | |
| ... | ... | ... | ... | ... | |

FIG. 7

| TIME | FOCUSING POINT | EXPLANATORY NOTE | SCHEDULED MOVING POSITION OF ROBOT |
|---|---|---|---|
| t0 | SCREEN | EXPLANATORY NOTE 1 | (x101, y101) |
| t1 | SCREEN | EXPLANATORY NOTE 2 | (x102, y102) |
| t2 | ROBOT | EXPLANATORY NOTE 3 | (x103, y103) |
| t3 | OBJECT ON EXHIBITION | EXPLANATORY NOTE 4 | (x104, y104) |
| t4 | OBJECT ON EXHIBITION | EXPLANATORY NOTE 5 | (x105, y105) |
| t5 | ROBOT | EXPLANATORY NOTE 6 | (x106, y106) |
| t6 | OBJECT ON EXHIBITION | EXPLANATORY NOTE 7 | (x107, y107) |
| ... | ... | ... | ... |

FIG. 8

| | OBJECT ON WHICH AUDIENCE IS DESIRED TO FOCUS | MOVEMENT OF LEG | CANDIDATE ACTION | CONDITION |
|---|---|---|---|---|
| ACTION FOR INCREASING ATTENTION LEVEL TO ROBOT | ROBOT IS WAYPOINT | ○ | APPROACH | |
| | | × | WAVE HAND AT AUDIENCE | |
| | | × | WATCH AUDIENCE | |
| | | × | CALL AUDIENCE | |
| | ROBOT IS OBJECT ON WHICH AUDIENCE IS DESIRED TO FOCUS | ○ | RUN | "ROBOT'S ACTION" OR "PERSON'S MOTION" IS EXPLAINED |
| | | ○ | HOP | "ROBOT'S ACTION" OR "PERSON'S MOTION" IS EXPLAINED |
| | | × | WAVE HAND AT AUDIENCE | |
| | | × | WATCH AUDIENCE | |
| | | × | CALL AUDIENCE | |
| ACTION FOR DECREASING ATTENTION LEVEL TO ROBOT | OBJECT ON WHICH AUDIENCE IS DESIRED TO FOCUS IS PRESENT | ○ | APPROACH | |
| | | × | POINT OBJECT | |
| | | × | CALL NAME OF OBJECT | |
| | | ○ | APPROACH OBJECT | |
| | | × | HOLDING AND SHOWING OBJECT | |
| | | ○ | HOLD OBJECT AND APPROACH | |
| | OBJECT ON WHICH AUDIENCE IS DESIRED TO FOCUS IS NOT PRESENT | × | INTERFERE WITH SIGHT LINE | |
| | | ○ | GET APART | |

FIG. 21

| IDENTIFIER | POSITION INFORMATION IN x-y PLANE | DIRECTION INFORMATION OF PERSON (x-y PLANE) | SIGHT LINE DIRECTION OF PERSON (z AXIS) | GAZE DIRECTION INFORMATION | HEIGHT INFORMATION | TOTAL NUMBER OF PERSONS |
|---|---|---|---|---|---|---|
| 1 | (x41, y41) | A1-1 | Z1-1 | V-1 | z41 | N |
| 2 | (x42, y42) | A1-2 | Z1-2 | V-2 | z42 | |
| 3 | (x43, y43) | A1-3 | Z1-3 | V-3 | z43 | |
| 4 | (x44, y44) | A1-4 | Z1-4 | V-4 | z44 | |
| ... | ... | ... | ... | ... | ... | |

FIG. 25

| TIME | FOCUSING POINT | | EXPLANATORY NOTE | SCHEDULED MOVING POSITION OF ROBOT |
|---|---|---|---|---|
| | FIRST AREA | SECOND AREA | | |
| t0 | SCREEN | ROBOT | EXPLANATORY NOTE 1 | (x101, y101) |
| t1 | SCREEN | ROBOT | EXPLANATORY NOTE 2 | (x102, y102) |
| t2 | ROBOT | ROBOT | EXPLANATORY NOTE 3 | (x103, y103) |
| t3 | OBJECT ON EXHIBITION | OBJECT ON WHICH AUDIENCE IS DESIRED TO FOCUS IS NOT PRESENT | EXPLANATORY NOTE 4 | (x104, y104) |
| t4 | OBJECT ON WHICH AUDIENCE IS DESIRED TO FOCUS IS NOT PRESENT | OBJECT ON EXHIBITION | EXPLANATORY NOTE 5 | (x105, y105) |
| t5 | ROBOT | ROBOT | EXPLANATORY NOTE 6 | (x106, y106) |
| t6 | OBJECT ON EXHIBITION | ROBOT | EXPLANATORY NOTE 7 | (x107, y107) |
| ... | ... | | | |

FIG. 29

| TIME | FIRST AREA | SECOND AREA |
|---|---|---|
| t0 | SCREEN | ROBOT |
| t1 | SCREEN | SCREEN |
| t2 | ROBOT | ROBOT |
| t3 | OBJECT ON EXHIBITION | ROBOT |
| t4 | OBJECT ON EXHIBITION | OBJECT ON EXHIBITION |
| t5 | ROBOT | ROBOT |
| t6 | OBJECT ON EXHIBITION | ROBOT |
| ... | ... | ... |

AUTONOMOUS MOVING DEVICE AND CONTROL METHOD OF AUTONOMOUS MOVING DEVICE

CROSS-REFERENCE TO RELATED APPLICATION

This application claims priority on Japanese Patent Application No. 2015-080337, filed Apr. 9, 2015, the content of which is incorporated herein by reference.

BACKGROUND OF THE INVENTION

Field of the Invention

The present invention relates to an autonomous moving device and a control method of the autonomous moving device.

Description of Related Art

Recently, a robot has often been employed to explain an object in exhibition on a stage, in a hall, or the like. When a robot moves and explains an object in exhibition suitably to various visitors, the robot may explain the object on exhibition by displaying charts or sentences on a large screen or explain the object in exhibition itself.

When a robot explains an object on exhibition, its purpose is to explain the object on exhibition, and thus a technique of explaining an object in exhibition by causing a robot to move depending on positions of the object in exhibition and visitors without interfering with the sight lines of the observers has been proposed (for example, see Japanese Unexamined Patent Application, First Publication No. 2009-285818 (hereinafter, referred to as Patent Literature 1)).

A system that determines a level of interest in a robot of each person on the basis of image information when a plurality of persons are entertained by the robot and determines an order of persons to be entertained by considering the levels of interest has been proposed (for example, see Japanese Unexamined Patent Application, First Publication No. 2009-248193 (hereinafter, referred to as Patent Literature 2)).

It has been found that a visitor may pay more attention to a robot than an object on exhibition or an explanatory note displayed on a screen.

SUMMARY OF THE INVENTION

However, in the technique described in Patent Literature 1, interference with sight lines of observers to an object in exhibition could be prevented, but focusing of the sight lines of the observers on the robot could not be prevented.

In the technique described in Patent Literature 2, observers are entertained in the order of decreasing the levels of interest in the robot.

Accordingly, in the technique described in Patent Literature 2, even when a plurality of visitors are simultaneously entertained or an object to be explained is explained in an exhibition, the visitors' attentions could not be paid to the object to be explained and focusing of the sight lines of the observers on the robot could not be prevented.

Aspects of the present invention are made in consideration of the above-mentioned problems, and an object of the present invention is to provide an autonomous moving device that can change an attention level of an audience on an object and a control method of the autonomous moving device.

In order to achieve the above-mentioned object, the present invention employs the following aspects.

(1) According to an aspect of the present invention, there is provided an autonomous moving device including: a measuring unit configured to measure a position and a posture of a person who is present in a predetermined area; an attention state estimating unit configured to estimate a first attention state of the person on the basis of information indicating the position and the posture of the person measured by the measuring unit; a state analyzing unit configured to determine a corrective course of action for correcting the first attention state on the basis of the estimated first attention state and a predetermined second attention state; and an action planning unit configured to determine an action corresponding to the determined corrective course of action.

(2) In the aspect according to (1), the attention state estimating unit may estimate a gaze direction in which the person present in the predetermined area watches as the first attention state on the basis of the information indicating the posture measured by the measuring unit.

(3) In the aspect according to (2), the second attention state may include a position of a focusing object which is an object which the person is desired to watch and information indicating the focusing object, and the attention state estimating unit may compare the estimated gaze direction with a focusing direction from the person to the focusing object and may determine whether the person watches the focusing object on the basis of the comparison result.

(4) In the aspect according to (3), when there is a plurality of objects, the attention state estimating unit may estimate focusing directions of the person to the plurality of the objects, may calculate angle differences between the gaze direction and the focusing directions, and may estimate the object corresponding to the focusing direction having the smallest angle difference among the calculated angle differences as the object which the person mostly watches.

(5) In the aspect according to (4), the attention state estimating unit may estimate that the person watches the object when the position of the object corresponding to the focusing direction having the smallest angle difference among the calculated angle differences is within the person's effective viewing angle.

(6) In the aspect according to (4) or (5), the attention state estimating unit may estimate the object watched by a plurality of persons who are present in the predetermined area as the first attention state, and the attention state estimating unit may calculate a ratio of the persons watching the object among the plurality of persons for each object and may estimate the object watched by the plurality of persons who are present in the predetermined area depending on the calculated ratios.

(7) In the aspect according to (6), the state analyzing unit may compare the object estimated by the attention state estimating unit with the focusing object and may determine whether a predetermined ratio or more of persons among the plurality of persons who are present in the predetermined area watch the focusing object.

(8) In the aspect according to (7), the state analyzing unit may determine the corrective course of action for correcting the attention state to change the gaze direction when it is determined that the ratio of the persons not watching the focusing object is equal to or greater than the predetermined ratio.

(9) In the aspect according to (7) or (8), the state analyzing unit may determine whether to increase the ratio of the persons watching the autonomous moving device or whether to decrease the ratio of the persons watching the autonomous moving device among the plurality of persons who are present in the predetermined area depending on the object watched by the predetermined ratio or more of persons and the focusing object when it is determined that the persons do not watch the focusing object.

(10) In the aspect according to (9), the state analyzing unit may determine whether to change the ratio of the persons watching the focusing object via the autonomous moving device or whether to change the ratio of the persons watching the autonomous moving device which is the focusing object as the corrective course of action depending on the object watched by the predetermined ratio or more of persons and the focusing object when it is determined that the ratio of the persons watching the autonomous moving device is to be increased.

(11) In the aspect according to (9), the state analyzing unit may determine whether to change the ratio of the persons watching the focusing object when the object on which the persons are desired to focus is set or whether to change the ratio of the persons watching the object when the object on which the persons are desired to focus is not set as the corrective course of action depending on the object watched by the predetermined ratio or more of persons and the focusing object when it is determined that the ratio of the persons watching the autonomous moving device is to be decreased.

(12) In the aspect according to any one of (2) to (11), the autonomous moving device may further include an action storage unit configured to store candidate actions based on the corrective course of action in advance, and the action planning unit may select one of the candidate actions stored in the action storage unit depending on the corrective course of action determined by the state analyzing unit.

(13) In the aspect according to (12), the action planning unit may preferentially select the candidate action which does not interfere with a predetermined action of the autonomous moving device.

(14) In the aspect according to (12) or (13), the action planning unit may preferentially select the candidate action which does not accompany movement of the autonomous moving device.

(15) In the aspect according to any one of (2) to (14), the autonomous moving device may further include an imaging unit configured to capture an image of the predetermined area, and the measuring unit may measure information indicating the gaze directions of the persons who are present in the predetermined area on the basis of the image captured by the imaging unit.

(16) In the aspect according to any one of (1) to (15), the autonomous moving device may further include an area dividing unit configured to divide the predetermined area into two or more divided areas, the attention state estimating unit may estimate the first attention state of the person on the basis of information indicating the position and the posture of the person measured by the measuring unit for each divided area, the state analyzing unit may determine the corrective course of action for correcting the first attention state on the basis of the estimated first attention state and the predetermined second attention state for each divided area, and the action planning unit may determine the action corresponding to the determined corrective course of action for each divided area.

(17) In the aspect according to (16), the action planning unit may set the divided area as an end point to which the autonomous moving device moves on the basis of the corrective course of action when the divided area in which the first attention state and the second attention state are different from each other is present as the comparison result.

(18) According to another aspect of the present invention, there is provided a control method of an autonomous moving device, including: measuring a position and a posture of a person who is present in a predetermined area; estimating a first attention state of the person on the basis of information indicating the position and the posture of the person; determining a corrective course of action for correcting the first attention state on the basis of the first attention state and a predetermined second attention state; and determining an action corresponding to the corrective course of action.

According to the aspects of (1) and (18), since the autonomous moving device estimates the first attention state of a person on an object, corrects the first attention state to the second attention state on the basis of the estimated first attention state and the predetermined second attention state, and determines an action corresponding to the correction details, it is possible to change an attention level of the audience on the object.

According to the aspect of (2), even when a plurality of persons are present in the predetermined area, it is possible to estimate the gaze directions of the persons with a small computational load.

According to the aspect of (3), it is possible to determine whether the object watched by the persons matches a focusing point.

According to the aspect of (4), it is possible to estimate the object which is watched by the persons on the basis of the deviations between the gaze directions and the focusing direction.

According to the aspect of (5), since visual characteristics of persons are considered, it is possible to accurately estimate an object which is watched by the persons.

According to the aspect of (6), even when a plurality of persons present in the predetermined area watch different objects, it is possible to estimate the object watched by the plurality of persons present in the predetermined area.

According to the aspect of (7), when the object watched by the plurality of persons present in the predetermined area does not match the focusing point, it is possible to determine the corrective course of action for correcting the attention state to change the gaze direction.

According to the aspect of (8), when the object watched by the plurality of persons present in the predetermined area does not match the focusing point, it is possible to determine whether to increase the ratio of the persons watching the autonomous moving device or whether to decrease the ratio of the persons watching the autonomous moving device depending on the object watched by the plurality of persons and the focusing point.

According to the aspect of (9), when the object watched by the plurality of persons present in the predetermined area does not match the focusing point, it is possible to determine whether to change the ratio of the persons watching the focusing point via the autonomous moving device or whether the autonomous moving device becomes the focusing point on which the persons are desired to focus as the corrective course of action depending on the object watched by the plurality of persons and the focusing point.

According to the aspect of (10), when the object watched by the plurality of persons present in the predetermined area does not match the focusing point, it is possible to determine whether an object on which the persons are desired to focus is present or whether an object on which the persons are desired to focus is not present as the corrective course of action depending on the object watched by the plurality of persons and the focusing point.

According to the aspect of (11), when the object watched by the plurality of persons present in the predetermined area does not match the focusing point, it is possible to determine whether an object on which the persons are desired to focus is present or whether an object on which the persons are desired to focus is not present as the corrective course of action depending on the object watched by the plurality of persons and the focusing point.

According to the aspect of (12), the autonomous moving device can perform an action based on the candidate action selected by the state analyzing unit.

According to the aspect of (13), it is possible to select a candidate action not interfering with the hosting or the action of the autonomous moving device.

According to the aspect of (14), since a candidate action accompanied with movement with a high operation cost can be set to a low selection priority, it is possible to effectively utilize electric power of a power supply (electric capacity of a battery) of the robot 1.

According to the aspect of (15), since the gaze directions are detected using the image captured by the imaging unit, it is possible to accurately estimate the gaze directions in the z-axis direction.

According to the aspect of (16), when the attention states of the persons present in each of the plurality of divided areas are different from the predetermined focusing points predetermined for each divided area, it is possible to change the attention states of the persons present in different areas.

According to the aspect of (17), when the attention states of the persons present in each of the plurality of divided areas are different from the predetermined focusing points predetermined for each divided area, it is possible to decrease an amount of movement by setting different areas as an end point of the movement.

BRIEF DESCRIPTION OF THE DRAWINGS

FIG. 3 is a diagram illustrating an example of information which is stored in a storage unit according to the first embodiment.

FIG. 4 is a diagram illustrating an example of information which is stored in the storage unit according to the first embodiment.

FIG. 7 is a diagram illustrating an example of information which is stored in a scenario storage unit according to the first embodiment.

FIG. 8 is a diagram illustrating an example of information on actions for changing an attention level to the robot which is stored in the scenario storage unit according to the first embodiment.

FIG. 21 is a diagram illustrating an example of information which is stored in a storage unit according to the second embodiment.

FIG. 25 is a diagram illustrating an example of information which is stored in a scenario storage unit according to a third embodiment.

FIG. 29 is a diagram illustrating examples of an object watched by persons present in the first area and an object watched by persons present in the second area at times t0 to t6.

DETAILED DESCRIPTION OF THE INVENTION

First, a summary of the present invention will be described below.

For example, in an event hall, a humanoid robot may serve as a host on a stage. In this case, scenarios, operations, voice signals, and the like may be stored in the robot in advance, and the robot may be made to perform the stored operations and to reproduce the stored voice signals with appropriate timings according to the scenarios. However, since an autonomous robot is still rare, persons (hereinafter, also referred to as an "audience") which are present in a hall may pay attention to the robot rather than an object on exhibition or explanation of a screen. A scenario is, for example, an explanatory note, an action of the robot, an image displayed on the screen, and the like that are determined in advance in an event or the like, each with a timing.

Accordingly, in this embodiment, it is determined whether an object watched by an audience matches an object to be explained. When not matched, the robot is controlled to change an attention level of the audience by increasing or decreasing the attention level on the robot. The attention level in the present invention is a ratio of the number of persons watching an object in an audience present in a predetermined area.

Hereinafter, embodiments of the present invention will be described with reference to the accompanying drawings. In the following description, an autonomous humanoid robot is exemplified as an autonomous moving device, but the autonomous moving device may be a device which can autonomously move with wheels attached thereto.

First Embodiment

Figure 1:
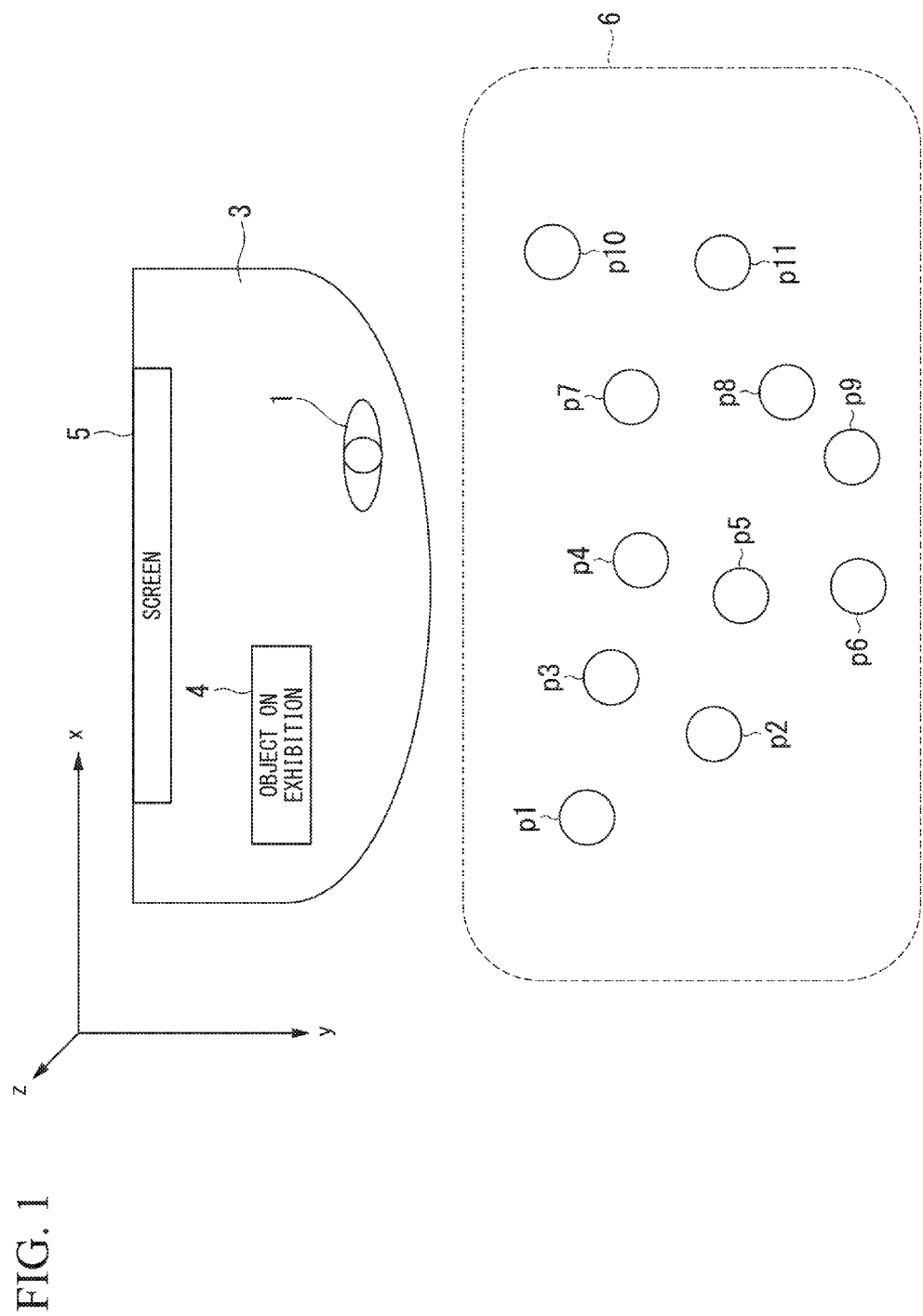
FIG. 1 is a diagram schematically illustrating a hall according to a first embodiment.

FIG. 1 is a diagram schematically illustrating a hall according to this embodiment. In FIG. 1, a plane parallel to the floor is defined as an x-y plane, a length direction (lateral direction) of a stage 3 is defined as an x-axis direction, a depth direction of the stage 3 is defined as a y-axis direction, and a height direction from the floor is defined as a z-axis direction.

As illustrated in FIG. 1, the stage 3 is present in the hall, and the front side of the stage 3 is an area in which an audience is present. An object on exhibition 4 (object) is exhibited, for example, on an exhibition stand on the left-front side on the stage 3. A screen 5 (object) is installed on the rear side of the stage 3. Depending on the situations, the robot 1 (object) provides an explanation to the audience while autonomously moving on the stage 3.

An area 6 (predetermined area) is an area in which the audience is measured by a sensor to be described later. In the example illustrated in FIG. 1, eleven persons p1 to p11 constituting the audience are present in the area 6. Hereinafter, when the audience is not individually specified, it is simply referred to as a person p.

The positions of the object on exhibition 4 and the screen 5 illustrated in FIG. 1 are examples and may be other positions. The area 6 is also an example, and the area may have a size based on characteristics of the sensor, the number of sensors, and the like.

Figure 2:
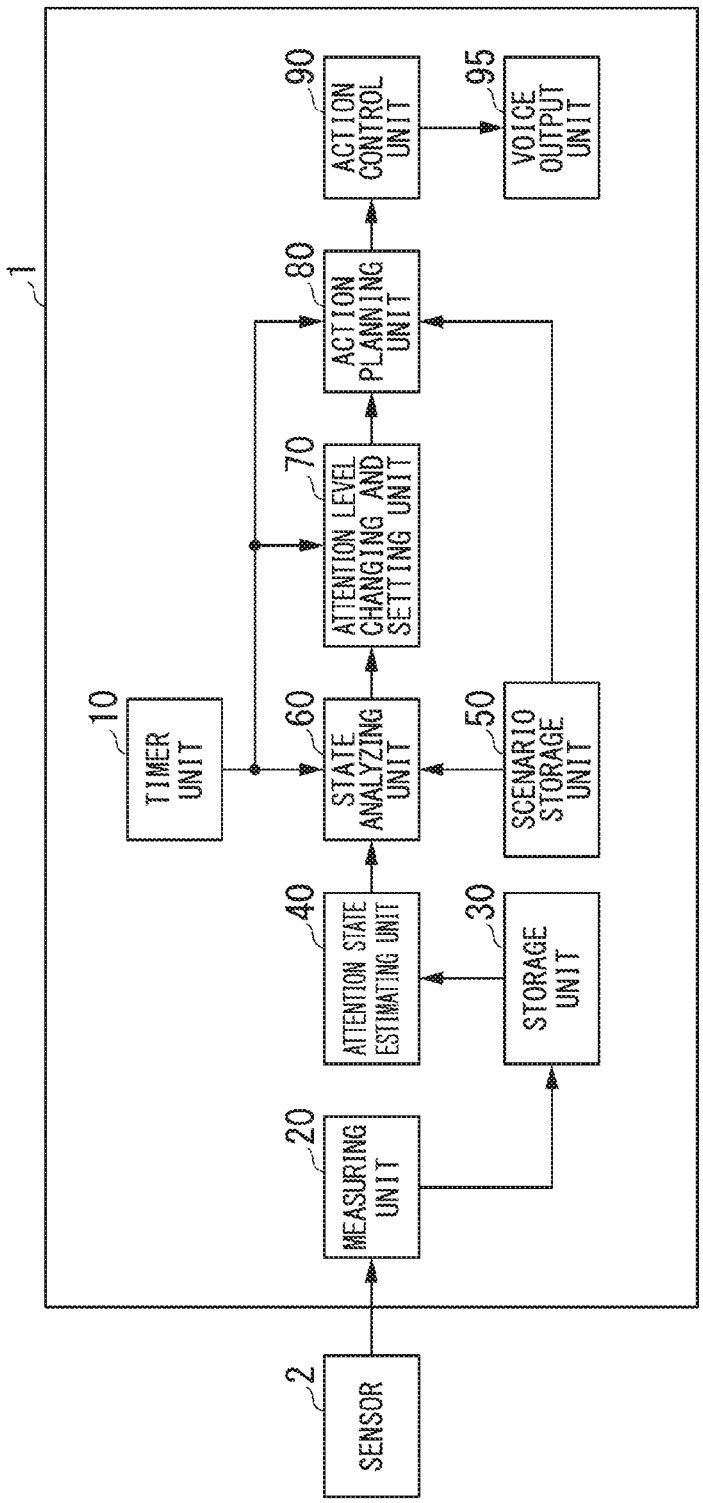
FIG. 2 is a block diagram schematically illustrating a robot according to the first embodiment.

FIG. 2 is a block diagram schematically illustrating a robot 1 according to this embodiment. Note that in FIG. 2, illustrations of a control unit controlling generation operations of the robot 1, a motor, a motor driving unit, and a power supply unit have been omitted.

As illustrated in FIG. 2, the robot 1 includes a timer unit 10, a measuring unit 20, a storage unit 30, an attention state estimating unit 40, a scenario storage unit 50 (action storage unit), a state analyzing unit 60, an attention level changing and setting unit 70 (state analyzing unit), an action planning unit 80, an action control unit 90, and a voice output unit 95. A sensor 2 is coupled to the robot 1.

The sensor 2 is a distance sensor and is, for example, a laser range finder (LRF) sensor (distance measuring unit). Here, n (where n is an integer equal to or greater than 1) sensors 2 transmit distance information of detected distances to the robot 1. The robot 1 and the n sensors 2 are connected to each other in a wireless or wired manner.

The LRF sensor is a three-dimensional distance-measurement scanner that serves to scan a space to be sensed at a predetermined pitch by emitting a laser beam and measuring a time in which the laser beam is reflected by an object and returned to detect a distance and a direction to the object. Each of a plurality of LRF sensors transmits information (hereinafter, referred to as distance-measurement point information) of the detected distance-measurement points to the robot 1 in a wireless or wired manner. The distance-measurement point information is correlated with a distance-measurement point number (for example, the number of steps), a unit vector in the x-axis direction, a unit vector in the y-axis direction, a distance between the sensor 2 and the distance-measurement point, and information indicating whether the distance-measurement point is normal. The x-axis direction and the y-axis direction constitute a coordinate system with the sensor 2 as an origin. Each LRF sensor is disposed at a position at which a person can be overlooked so as to partially overlap the spaces to be sensed, for example, on a ceiling, a wall, or the like of the spaces to be sensed. In this embodiment, the LRF sensor is used as an example of the sensor, but the present invention is not limited to this example and may be another sensor.

The timer unit 10 outputs time information indicating an elapsed time to the state analyzing unit 60, the attention level changing and setting unit 70, and the action planning unit 80. The timer unit 10 may, for example, be initialized when the robot 1 starts its explanation.

The measuring unit 20 calculates x, y, and z components of each distance-measurement point using the distance-measurement point information input from the sensor 2. Specifically, the measuring unit 20 calculates the x, y, and z components of each distance-measurement point by multiplying the unit vector in the x-axis direction and the unit vector in the y-axis direction by the distance between the sensor 2 and the distance-measurement point. The measuring unit 20 transforms the calculated x, y, and z components, for example, from the coordinate system of the sensor 2 to the coordinate system of the robot 1 using a known coordinate transformation method. The measuring unit 20 does not calculate the x, y, and z components of a distance-measurement point having information indicating that the distance-measurement point is abnormal. In this embodiment, the measuring unit 20 calculates the x, y, and z components of each distance-measurement point using the distance-measurement point information input from the sensor 2, but the present invention is not limited to this configuration. The sensor 2 may calculate the x, y, and z components of each distance-measurement point and may output the calculated x, y, and z components of each distance-measurement point to the measuring unit 20.

The measuring unit 20 projects the distance-measurement points onto the x-y plane using the x-direction component and the y-direction component of each distance-measurement point. The projected distance-measurement point is referred to as a projection point. The measuring unit 20 classifies a plurality of projection points projected onto the x-y plane into clusters (also referred to as clustering) using a known method. The measuring unit 20 classifies the distance-measurement points, for example, using a hierarchical method such as a shortest distance method. Each classified cluster corresponds to sets of the distance-measurement point for each person. In information included in the cluster, a z component is correlated with the xy coordinate of each projection point. The measuring unit 20 calculates the position of the center of gravity of each cluster as a person cluster data position and calculates the direction of the cluster as the direction of the person p for each cluster. Here, the direction of the person p is a body angle of the person p with respect to the x-axis direction as will be described later with reference to FIG. 10. The measuring unit 20 calculates the estimated direction in which the person p looks on the basis of the calculated direction of the person p and calculates the value of the projection point having the largest z component among the projection points included in each cluster as the person cluster data height. The direction in which the person p looks is a direction of a sight line of the person p, and height information of the person p is, for example, information indicating a height from the floor to the nose tip of the person p. The measuring unit 20 calculates the total number of clusters in the area 6 as the total number N of the persons p present in the area 6. The measuring unit 20 generates person cluster data by correlating the person cluster data position, the direction of the person p, the gaze direction of the person p, and the person cluster data height which are calculated for each cluster and stores the generated person cluster data in the storage unit 30. The measuring unit 20 stores the calculated total number N of persons p present in the area 6 in the storage unit 30. The method of calculating the person cluster data and the information indicating the total number N of persons p and the method of calculating the person cluster data position will be described later.

The measuring unit 20 assigns an identifier (ID) to each classified cluster and performs a tracking process on the cluster having an identifier assigned thereto with a predetermined sampling timing. For example, the measuring unit 20 determines that the cluster for which the tracking process fails is not present in the area 6 and deletes from the storage unit 30 the information on the cluster having an identifier assigned thereto for which the tracking process fails.

In this embodiment, the information indicating the person cluster data position, the direction of the person p, the gaze direction of the person p, the person cluster data height, and the total number of persons p present in the area 6 is stored in the storage unit 30, but such information may be output to the attention state estimating unit 40.

As illustrated in FIG. 3, position information of each object is stored in the storage unit 30. The object is at least one of the robot 1, the object on exhibition 4, and the screen 5.

The position information includes information indicating the position at which the screen 5 is disposed, information indicating the position at which the object on exhibition 4 is disposed, and information indicating the position of the robot 1. FIG. 3 is a diagram illustrating an example of the information which is stored in the storage unit 30 according to this embodiment. In the example illustrated in FIG. 3, the coordinates ((x11, y11, z11), (x13, y11, z11), (x11, y11, z13), and (x13, y11, z13)) of the four corners (see FIG. 5) of the screen 5 and the coordinate (x12, y11, z12) of the center of gravity of the screen are stored as the position information of the screen 5. The coordinates ((x21, y21, z21), (x23, y21, z21), (x21, y21, z23), and (x23, y21, z23)) of the four corners (see FIG. 6) of the object on exhibition 4 and the coordinate (x22, y21, z22) of the center of gravity of the object on exhibition are stored as the position information of the object on exhibition 4. The coordinates ((x31, y31, z31), (x33, y31, z31), (x31, y31, z33), and (x33, y31, z33)) of four corners of the robot 1 and the coordinate (x32, y31, z32) of the center of gravity of the robot are stored as the position information of the robot 1. Since the robot 1 autonomously moves, in the initial state, the initial position information based on the scenario stored in the scenario storage unit 50 may be stored in the storage unit 30. The origin of the coordinates is a predetermined point and may be set to, for example, the floor on the upper-left side of the stage 3 (see FIG. 1). For example, the information stored in the storage unit 30 may include information indicating the coordinates of the center of gravity of each object and the magnitude thereof on the x-y plane. In this case, the attention state estimating unit 40 may calculate the coordinates of four corners of each object using the stored information. Alternatively, the information stored in the storage unit 30 may include only the coordinates of four corners of each object. In this case, the attention state estimating unit 40 may calculate the coordinate of the center of gravity of each object using the stored information.

In the storage unit 30, as illustrated in FIG. 4, person cluster data in which the identifier, the information (person cluster data position) indicating the position on the x-y plane, the information indicating the direction of the person p, gaze direction information indicating the gaze direction of the person p, and the height information (person cluster data height) are correlated is stored for each person p present in the area 6. In the storage unit 30, as illustrated in FIG. 4, the total number N of persons p present in the area 6 is stored. FIG. 4 is a diagram illustrating an example of the information which is stored in the storage unit 30 according to this embodiment. As illustrated in FIG. 4, for example, in the person cluster data having an identifier (ID) of 1, the position information (x41, y41) on the x-y plane, the person direction information A1-1, the gaze direction information V-1, and the height information z41 are correlated.

Figure 5:
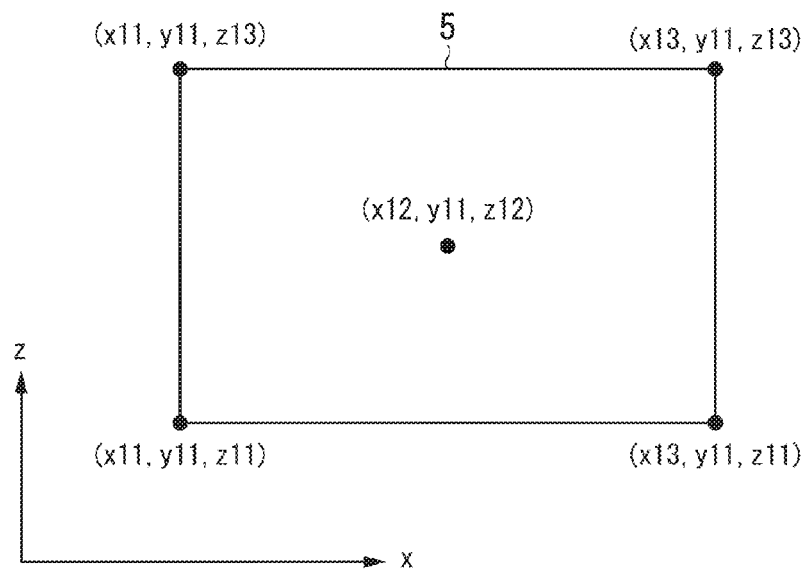
FIG. 5 is a diagram illustrating an example of position information of a screen according to the first embodiment.

FIG. 5 is a diagram illustrating an example of the position information of the screen 5 according to this embodiment. In the example illustrated in FIG. 5, the screen 5 is a planar screen. The position information of the screen 5 includes the coordinates ((x11, y11, z11), (x13, y11, z11), (x11, y11, z13), and (x13, y11, z13)) of the four corners (see FIG. 5) of the screen 5 and the coordinate (x12, y11, z12) of the center of gravity of the screen.

Figure 6:
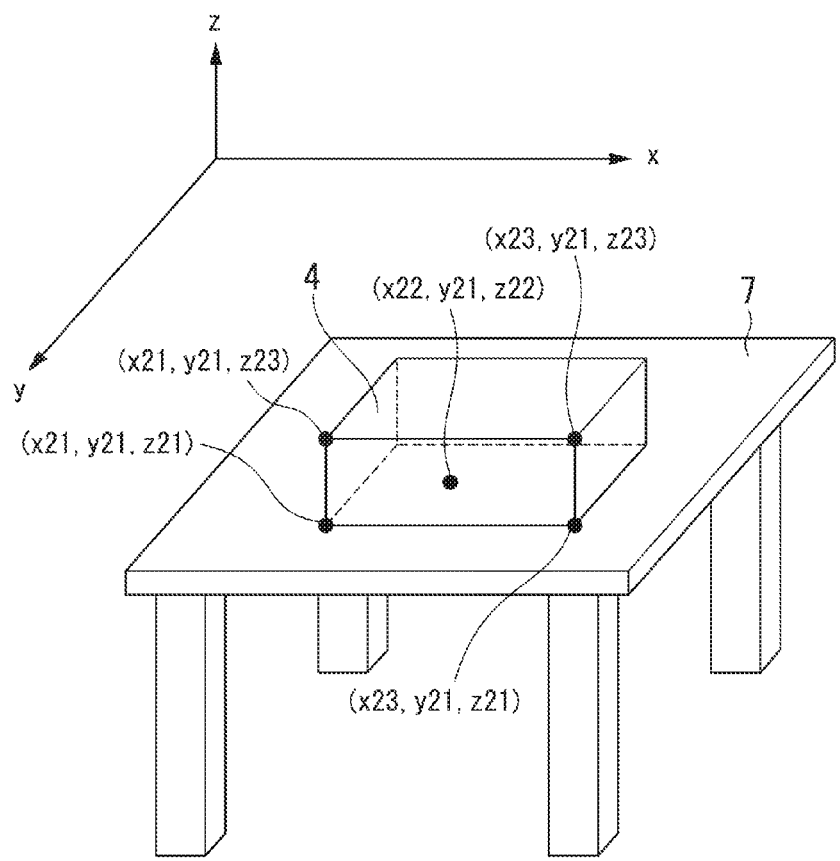
FIG. 6 is a diagram illustrating an example of position information of an object on exhibition according to the first embodiment.

FIG. 6 is a diagram illustrating an example of the position information of the object on exhibition 4 according to this embodiment. In the example illustrated in FIG. 6, the object on exhibition 4 is exhibited on a table 7. In the example illustrated in FIG. 6, the position information of the object on exhibition 4 includes the coordinates ((x21, y21, z21), (x23, y21, z21), (x21, y21, z23), and (x23, y21, z23)) of the four front corners (see FIG. 6) of the object on exhibition 4 seen from the audience and the coordinate (x22, y21, z22) of the center of gravity of the object on exhibition. The coordinate systems in FIGS. 5 and 6 are the same as in FIG. 1.

The robot 1 will continue to be described with reference to FIG. 2.

The attention state estimating unit 40 reads the position information of the objects, the person cluster data, and the total number N of persons present in the area 6 which are stored in the storage unit 30. The attention state estimating unit 40 estimates the object (first attention state) most watched by each person p using the read information and outputs the estimation result (first attention state) for each person p to the state analyzing unit 60. The attention state estimating unit 40 estimates the position of the robot 1 on the basis of values detected by sensors (not illustrated) of the robot 1. Here, the estimation result includes at least one set of information and a ratio of the audience out of a set of information indicating that the robot 1 is watched and a ratio of the audience watching the robot 1, a set of information indicating that the audience is watching the desired object of interest and a ratio of the audience watching the desired object of interest, and a set of information indicating that other objects are watched (including absence of any watched object) and a ratio of the audience watching other objects. Here, other objects being watched (including absence of any watched object) indicates a state in which the audience watches objects other than the objects of interest (the robot 1 and the desired object interest). The method of determining the ratio of the audience and the object watched by the persons p will be described later.

In the scenario storage unit 50, as illustrated in FIG. 7, a time, information indicating an object (hereinafter, referred to as a focusing point (second attention state)) on which the persons p are desired to focus at the time, information indicating an explanatory note, and information indicating a scheduled position to which the robot 1 moves are stored, correlated with each other. The information indicating a focusing point includes information (first attention state) indicating that an object on which the audience is desired to focus is not present.

FIG. 7 is a diagram illustrating an example of information which is stored in the scenario storage unit 50 according to this embodiment. In the example illustrated in FIG. 7, the focusing point at times t0 and t1 is the screen 5, the focusing point at times t2 and t5 is the robot 1, and the focusing point at times t3, t4, and t6 is the object on exhibition 4. In the example illustrated in FIG. 7, at time t0 of the scenario, the robot 1 outputs a voice signal of explanation 1 on an image projected onto the screen 5 while moving to the position (x101, y101).

In the scenario storage unit 50, as illustrated in FIG. 8, information on an action for increasing the attention level to the robot 1 and information on an action for decreasing the attention level to the robot 1 are stored.

FIG. 8 is a diagram illustrating an example of the information on an action for changing the attention level to the robot 1 which is stored in the scenario storage unit 50 according to this embodiment.

As illustrated in FIG. 8, in the scenario storage unit 50, an object on which the audience is desired to focus, leg movements, a candidate action, and associated conditions are stored, correlated with the action for increasing the attention level to the robot 1. In the scenario storage unit 50, an object on which the audience is desired to focus, leg movements, a candidate action, and associated condition are also stored, correlated with the action for decreasing the attention level to the robot 1. Here, the leg movements are actions accompanied with the leg movements of the robot 1 and examples thereof include a walking operation, a running operation, and a hopping operation by the robot 1. Examples of an action not accompanied with the leg movements include operations of waving a hand at the audience, watching the audience, calling the audience, pointing to an object on which the audience is desired to focus with a hand, calling a name of an object on which the audience is desired to focus, holding and showing an object on which the audience is desired to focus, turning the sight line of the audience (also referred to as cutting the sight line). In FIG. 8, a circular (O) mark indicates a candidate action accompanied with the leg movements, and an ex (X) mark indicates a candidate action not accompanied with the leg movements.

As illustrated in FIG. 8, the actions for increasing the attention level to the robot are classified into actions for the robot 1 being a waypoint and actions for the robot 1 being an object on which the audience is desired to focus. The actions for the robot 1 being a waypoint are actions for changing the audience's attention from the current object under attention to another object by first attracting the attention of the audience to the robot 1 and then explaining the object on exhibition 4 as an object on which the audience is desired to focus or the like. Examples of the actions for the robot 1 being a waypoint include approaching the audience, the object on exhibition 4, or the screen 5 in a non-intrusive manner, waving a hand at the audience, watching the audience, and calling the audience.

Examples of the actions for the robot 1 being an object on which the audience is desired to focus include actions of running, hopping, watching the audience, calling the audience, and approaching the audience.

As illustrated in FIG. 8, the actions for decreasing the attention level to the robot are classified into actions for when an object other than the robot 1 on which the audience is desired to focus is present and actions for when an object on which the audience is desired to focus is not present. Examples of the actions for when an object other than the robot 1 on which the audience is desired to focus is present include pointing to an object such as the object on exhibition 4 or the screen 5, calling a name (title) of an object, approaching an object, holding and showing an object, and approaching the center of the stage with an object. The actions for when an object on which the audience is desired to focus is not present include actions of cutting the sight line to the audience and getting away from the audience.

When an operation of the robot 1 or movement of a person is explained, it is necessary to prevent an action not related to the explanation details from being performed so as not to interfere with the explanation, and thus actions of running and hopping are selected as the candidate action.

In the present invention, a corrective course of action includes a course of action in which a predetermined action schedule for each time stored in the scenario storage unit 50 is not changed and a course of action in which an action scheduled is changed. The course of action in which an action schedule is changed includes an action course for increasing the attention level to the robot 1 and an action course for decreasing the attention level to the robot 1 as described above. The action course for increasing the attention level to the robot 1 includes an action course for when the robot 1 is set as a waypoint and an action course when the robot 1 is an object on which the audience is desired to focus. The action course for decreasing the attention level to the robot 1 includes an action course for when an object on which the audience is desired to focus is other than the robot 1 and an action course for when an object on which the audience is desired to focus is not present.

The robot 1 will continue to be described with reference to FIG. 2.

The state analyzing unit 60 reads the information indicating a focusing point at a corresponding time, which is stored in the scenario storage unit 50, on the basis of the time information input from the timer unit 10. The state analyzing unit 60 determines whether an object watched by the audience matches the focusing point stored in the scenario storage unit 50 for each time on the basis of the read information indicating the focusing point and the estimation result input from the attention state estimating unit 40. The state analyzing unit 60 outputs the determination result and the information indicating the focusing point for each time to the attention level changing and setting unit 70. The determination result is one of an information set (determination result 1) indicating that an object watched by the person p matches the focusing point and an information set (determination result 2) indicating that an object watched by the person p does not match the focusing point. Determination result 2 includes information indicating an object watched by the person p.

The method of determining whether an object watched by the audience matches the focusing point will be described later.

The time information from the timer unit 10, the determination result, and the information indicating the focusing point from the state analyzing unit 60 are input to the attention level changing and setting unit 70. When the information indicating that an object watched by the person p matches the focusing point is input, the attention level changing and setting unit 70 sets the attention level not to be changed (hereinafter, referred to as non-changing setting). On the other hand, when the information indicating that an object watched by the person p does not match the focusing point is input from the state analyzing unit 60, the attention level changing and setting unit 70 determines whether to increase the attention level to the robot 1 or whether to decrease the attention level to the robot 1. The attention level changing and setting unit 70 determines whether the object watched by the person p should be changed to an object on which the audience is desired to focus via the robot 1 (hereinafter, referred to as the robot 1 is a waypoint), whether the robot 1 is an object on which the audience is desired to focus, whether an object on which the audience is desired to focus is other than the robot 1, or whether an object on which the audience is desired to focus is not present. The attention level changing and setting unit 70 outputs to the action planning unit 80 any one set of setting information of information indicating the non-changing setting, information indicating that the robot 1 is a waypoint, information indicating that the robot 1 is an object on which the audience is desired to focus, information indicating that an object on which the audience is desired to focus is other than the robot 1, and information indicating that an object on which the audience is desired to focus is not present.

When the information indicating the non-changing setting is input from the attention level changing and setting unit 70, the action planning unit 80 selects a corrective course of action in which the scenario (such as generation of an explanatory note and an action) at that time stored in the scenario storage unit 50 continues to be performed, that is, the action is not changed. In this case, the action planning unit 80 reads information indicating an explanatory note based on the time information input from the timer unit 10 and information indicating the scheduled position to which the robot 1 moves and outputs the read information as a candidate action to the action control unit 90.

On the other hand, when one of the information set indicating that the robot 1 is a waypoint, the information set indicating that the robot 1 is an object on which the audience is desired to focus, the information set indicating that an object on which the audience is desired to focus is other than the robot 1, and the information set indicating that an object on which the audience is desired to focus is not present is input from the attention level changing and setting unit 70, the action planning unit 80 selects one corresponding candidate action from the scenario storage unit 50. The action planning unit 80 determines the selected candidate action as an action plan. The method of selecting a candidate action will be described later. The action planning unit 80 outputs information indicating the selected candidate action to the action control unit 90.

The action control unit 90 controls utterance, an action, and the like of the robot 1 on the basis of the information indicating a candidate action input from the action planning unit 80 and detected values of various sensors of the robot 1. When the information indicating an explanatory note is input from the action planning unit 80, the action control unit 90 converts character information into a voice signal using a known method and outputs the converted voice signal via the voice output unit 95. The voice output unit 95 outputs the voice signal input from the action control unit 90 and is, for example, a speaker.

Generation of Person Cluster Data

An example of the method of generating person cluster data, which is performed by the measuring unit 20, will be described below.

Figure 9:
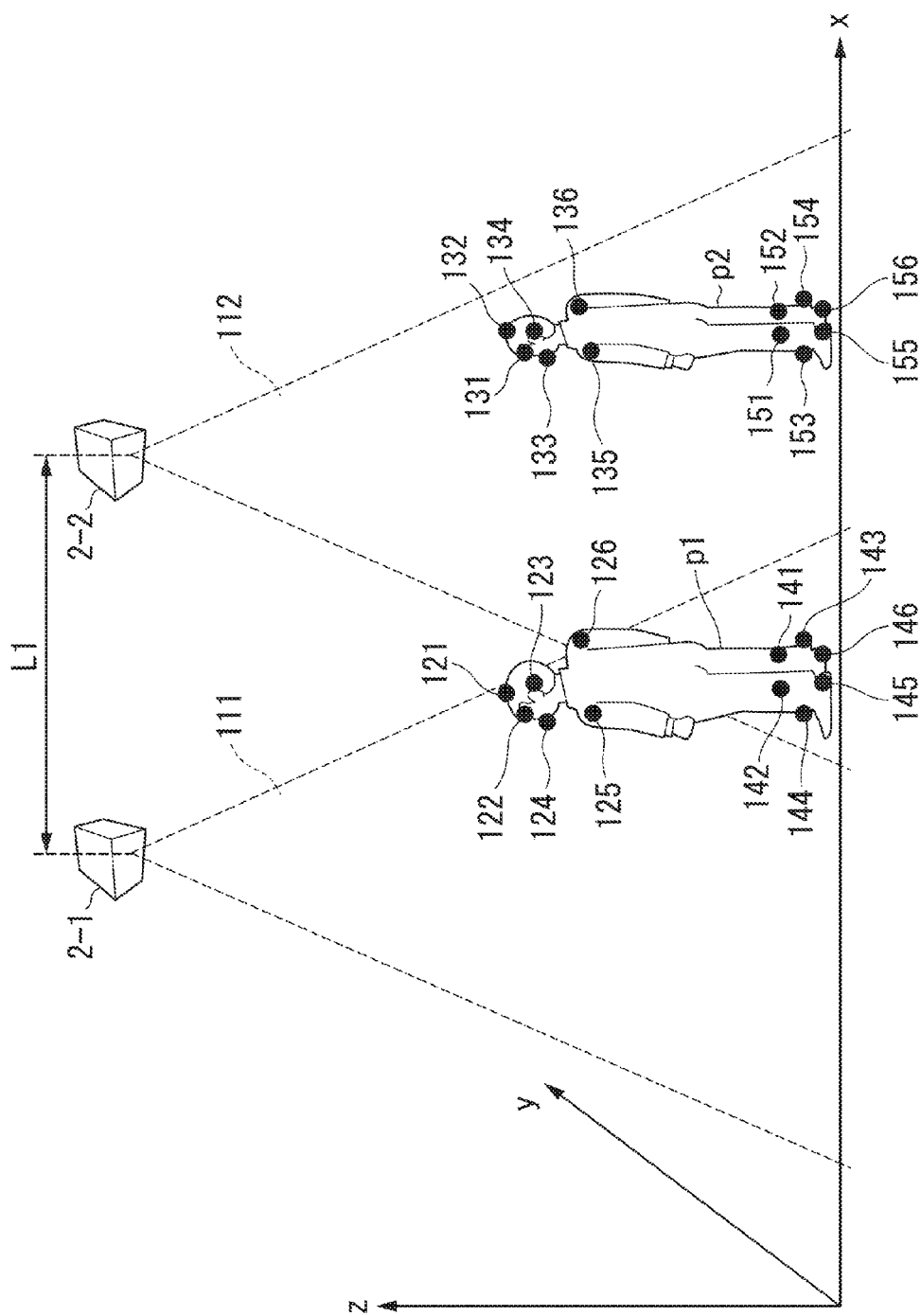
FIG. 9 is a diagram illustrating a measuring process which is performed by a sensor and a process which is performed by a measuring unit according to the first embodiment.

FIG. 9 is a diagram illustrating a measuring process which is performed by the sensor 2 and a process which is performed by the measuring unit 20 according to this embodiment. The coordinate system in FIG. 9 is the same as in FIG. 1. In the example illustrated in FIG. 9, a person p1 and a person p2 are present.

In the example illustrated in FIG. 9, two sensors 2-1 and 2-2 are installed separated by a distance L1 on the ceiling of the space to be sensed. An area 111 denotes an area (hereinafter, referred to as a detection area) which can be detected by the sensor 2-1 and an area 112 denotes a detection area of the sensor 2-2.

In the example illustrated in FIG. 9, distance-measurement points (121 to 126 and 131 to 136) equal to or higher than a predetermined height are illustrated.

In the example illustrated in FIG. 9, the person p1 and the person p2 are present in the detection area 111 of the sensor 2-1 and the detection area 112 of the sensor 2-2.

The distance-measurement points 121 to 126 are measuring points for the person p1 and the distance-measurement points 131 to 136 are measuring points for the person p2. For example, the measuring points are points corresponding to a head top, an ear, a nose tip, and a shoulder of a person.

The distance-measurement points 122 to 125 are distance-measurement points measured by the sensor 2-1 and the distance-measurement point 126 and the distance-measurement points 131 to 136 are distance-measurement points measured by the sensor 2-2.

The measuring unit 20 calculates x-axis, y-axis, and z-axis components using the information included in the distance-measurement points acquired from the sensors 2-1 and 2-2. The measuring unit 20 projects the distance-measurement points for which the value of the z-axis component among the calculated x-axis, y-axis, and z-axis components of the distance-measurement point is equal to or greater than a predetermined value onto the x-y plane using the x-axis component and the y-axis component included in the information of each distance-measurement point indicating points 141 to 146 and points 151 to 156. In FIG. 9, the points 141 to 146 are points which are obtained by projecting the distance-measurement points 121 to 126 of the person p1 onto the x-y plane. The points 151 to 156 are points which are obtained by projecting the distance-measurement points 131 to 136 of the person p2 onto the x-y plane. The measuring unit 20 performs a clustering process of classifying the projection points projected onto the x-y plane into clusters. By the clustering process, the distance-measurement points 121 to 126 are generated as the person cluster data of the person p1, and the distance-measurement points 131 to 136 are generated as the person cluster data of the person p2.

Figure 10:
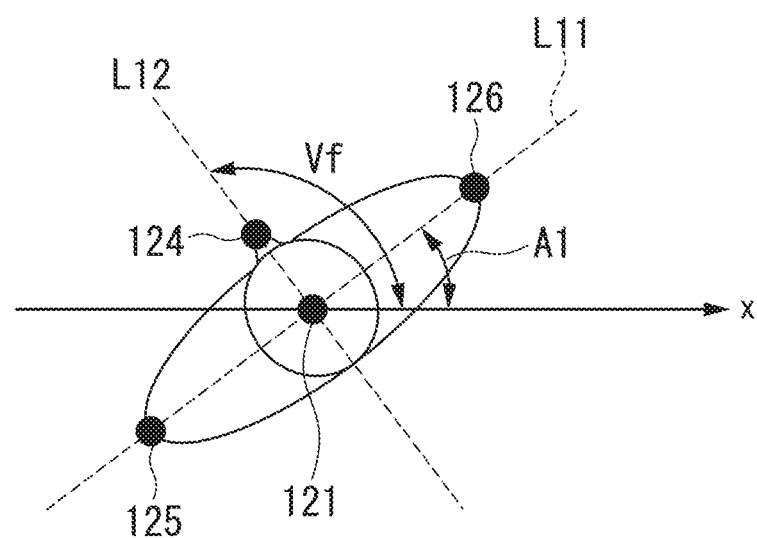
FIG. 10 is a diagram illustrating an example in which a distance-measurement marker is projected onto an x-y plane.

FIG. 10 is a diagram illustrating an example in which the distance-measurement points are projected onto the x-y plane according to this embodiment. In the example illustrated in FIG. 10, the distance-measurement point 121 corresponds to the head top, the distance-measurement point 124 corresponds to the nose tip, the distance-measurement point 125 corresponds to the left shoulder, and the distance-measurement point 126 corresponds to the right shoulder. In FIG. 10, a line segment L11 is a line segment connecting the distance-measurement points corresponding to the right and left shoulders, and a line segment L12 is a line segment passing through the distance-measurement point 124 and perpendicular to the line segment L11. An angle A1 is an angle of the line segment L11 with respect to the x axis, and an angle Vf is an angle (=90°±A1) of the line segment L12 with respect to the x axis.

The measuring unit 20 detects the direction (first attention state) of the person p using the angle A1 (posture) and the angle Vf (posture).

In the example illustrated in FIG. 10, the direction of a person p is detected using the distance-measurement point corresponding to the tip of the person's nose, but the present invention is not limited to this example. In general, in a hall, persons (with a posture) with their back turned to the stage are rare. Accordingly, under the assumption that the audience faces the front side, the direction of each person p may be detected using the distance-measurement point 121 corresponding to the top of each person's head, the distance-measurement point 125 corresponding to the person's left shoulder, and the distance-measurement point 126 corresponding to the person's right shoulder.

The flow of the clustering process and the person cluster data generating process will be described below.

Figure 11:
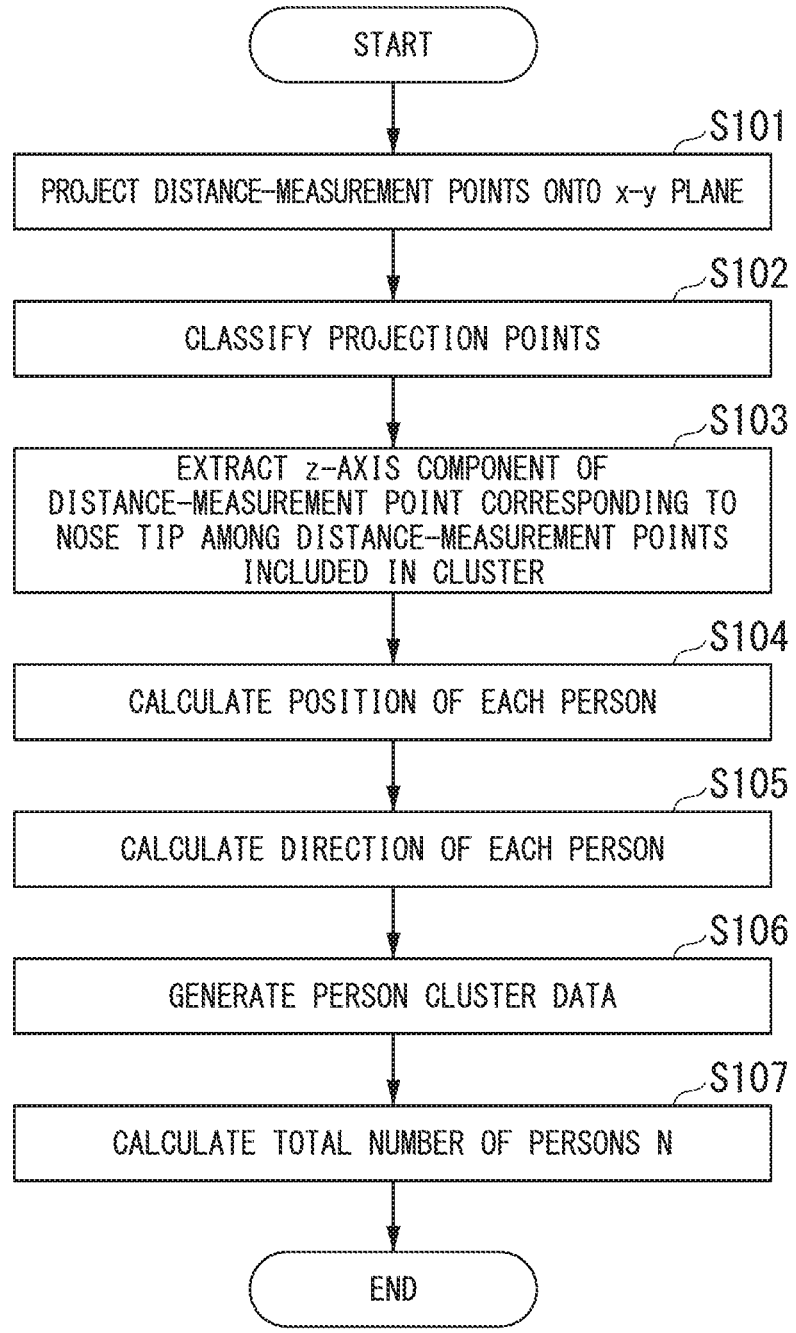
FIG. 11 is a flowchart illustrating a flow of a clustering process and a person cluster data generating process according to the first embodiment.

FIG. 11 is a flowchart illustrating a flow of the clustering process and the person cluster data generating process according to this embodiment.

(Step S101) The measuring unit 20 calculates the x-axis, y-axis, and z-axis components using the information input from the sensors 2 and included in the distance-measurement points. Subsequently, the measuring unit 20 projects the distance-measurement points for which the calculated z-axis component is equal to or greater than a predetermined value onto the x-y plane using the x-axis component and the y-axis component which are included in the information of the distance-measurement points. The measuring unit 20 moves the process flow to step S102.

(Step S102) The measuring unit 20 classifies the projection points projected onto the x-y plane into clusters.

The measuring unit 20 moves the process flow to step S103.

(Step S103) The measuring unit 20 extracts the z-axis component of the distance-measurement point corresponding to the nose tip among the distance-measurement points corresponding to the projection points included in the cluster for each classified cluster and sets the extracted z-axis component as the person cluster data height of the cluster. The measuring unit 20 moves the process flow to step S104.

(Step S104) The measuring unit 20 calculates the position of the center of gravity of the projection points included in the cluster for each classified cluster and sets the calculated position of the center of gravity as the person cluster data position. The measuring unit 20 may set the position of the center of gravity of the distance-measurement points included in the person cluster data as the person cluster data position or may set the distance-measurement point corresponding to the head top as the person cluster data position. The cluster data position of each person includes at least the values in the x-axis direction and the y-axis direction. The measuring unit 20 moves the process flow to step S105.

(Step S105) The measuring unit 20 estimates the direction of each person for each classified cluster. For example, the measuring unit 20 estimates the angle of the line segment L11 (see FIG. 9) connecting the distance-measurement points corresponding to the right and left shoulders with respect to the x axis to be the direction (hereinafter simply referred to as a direction) of the person p with respect to the x-axis direction. At this time, the direction in which the distance-measurement point corresponding to the nose tip is present is estimated to be the front side of the person p. The measuring unit 20 moves the process flow to step S106.

(Step S106) The measuring unit 20 correlates the person cluster data position and the person cluster data height for each cluster, the information of the distance-measurement point projected onto the x-y plane and included in the cluster, and the information (first attention state) indicating the direction of the person p to generate person cluster data for each cluster and stores the generated person cluster data for each cluster in the storage unit 30. As described above, the person cluster data includes the person cluster data position, the person cluster data height, the information of the distance-measurement points projected onto the x-y plane and included in the cluster, and the information indicating the direction of the person p. The measuring unit 20 moves the process flow to step S107.

(Step S107) The measuring unit 20 calculates the number of generated person cluster data as the total number N of persons present in the area 6 (see FIG. 1) and stores the calculated total number N of persons present in the area 6 in the storage unit 30.

Then, the flow of the clustering process and the person cluster data generating process ends.

When the number of sensors 2 is two or more, the measuring unit 20 combines the distance information (distance-measurement points) input from the plural sensors 2 and then performs the processes of steps S101 to S107. The measuring unit 20 may perform the processes of steps S101 to S103 for individual distance information of the sensors 2, may combine the processed information, and then may perform the processes of step S104 and steps subsequent thereto using the combined information. The combination means combining plural clusters for one person classified using the distance information of different sensors 2 into one cluster on the basis of the information indicating the position of the center of gravity of the clusters.

Focusing Point, Watching Range of Person

A relationship among the robot 1, the object on exhibition 4, and the screen 5 on the stage 3 and the position, the direction, and the like of a person p (person cluster data position) will be described below.

Figure 12:
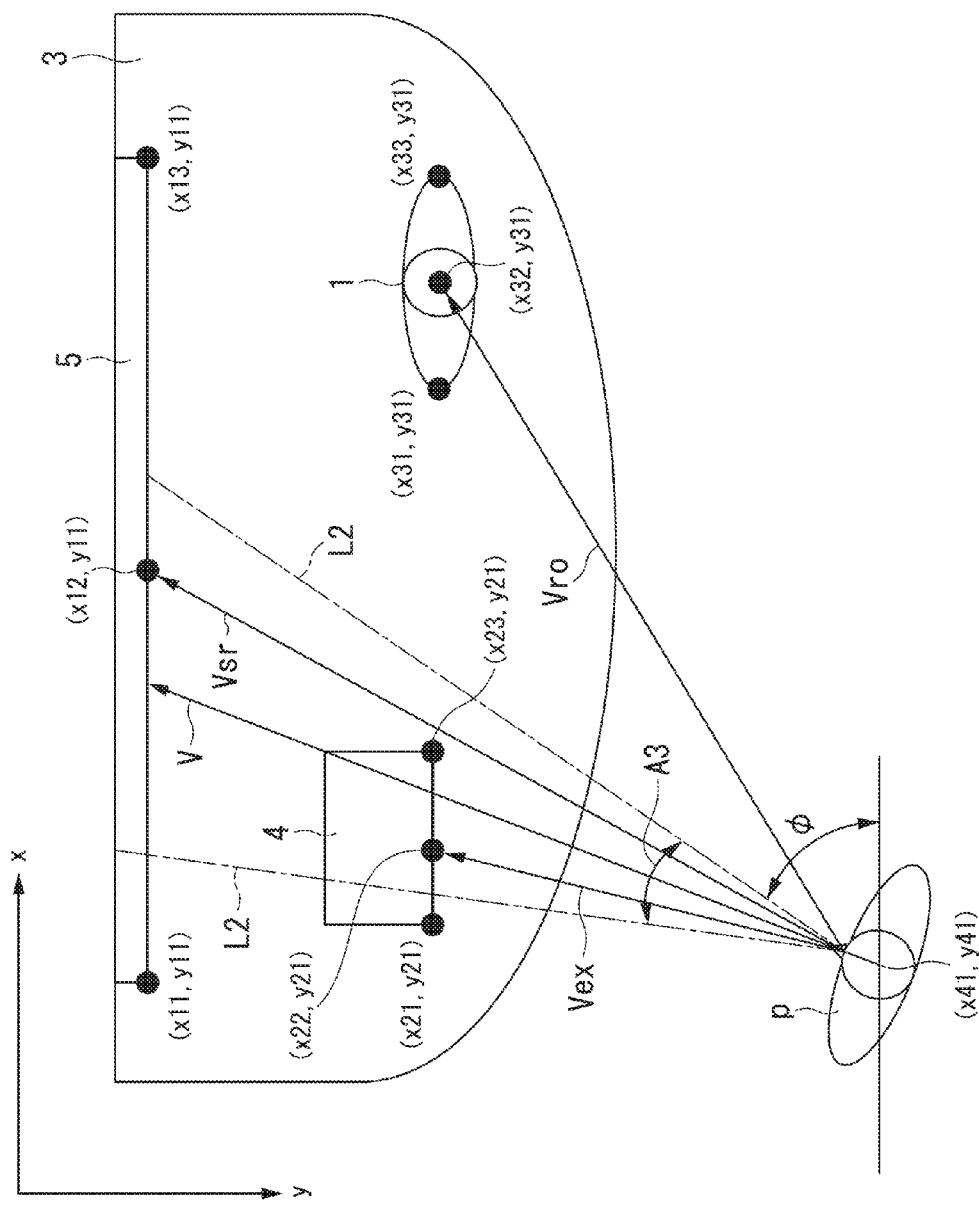
FIG. 12 is a diagram illustrating examples of coordinates of objects on a stage and a position of a person, a direction in which a person is facing, and a direction in which a person is looking according to the first embodiment.

FIG. 12 is a diagram illustrating examples of the coordinates of objects on the stage 3 and the position, the direction, and the gaze direction of a person p according to the first embodiment. The coordinate system in FIG. 12 is the same as FIG. 1. In the example illustrated in FIG. 12, the range in the x-axis direction of the screen 5 is from (x11) to (x13) and the coordinate in the x-axis direction of the center of gravity is (x12). The range in the x-axis direction of the object on exhibition 4 is from (x21) to (x23) and the coordinate in the x-axis direction of the center of gravity thereof is (x22). The range in the x-axis direction of the robot 1 is from (x31) to (x33), and the coordinate in the x-axis direction of the center of gravity thereof is (x32).

In FIG. 12, the screen 5 is present on the rear side of the stage 3, the object on exhibition 4 is placed at the front-left side of the stage 3, the robot 1 is present at the front-right side of the stage 3, and a person p watches the stage 3. In the example illustrated in FIG. 12, only one person among persons present in the predetermined area 6 is illustrated for the purpose of simplification of explanation.

In the example illustrated in FIG. 12, the person p is present at a position of a coordinate (x41, y41). The angle with respect to the x-axis direction which is the direction of the person p is defined as $\phi$ and the vector indicating the gaze direction and the distance of the person p is defined as V. In the example illustrated in FIG. 12, the end point of the vector V is located on the screen 5.

A line segment L2 indicates the range of an effective viewing angle A3 in the x-y plane (horizontal) of the person p. That is, the attention state estimating unit 40 considers the range in the x-y plane watched by the person p to be within the range of the effective viewing angle A3. In this embodiment, the effective viewing angle means a range of viewing field from within which a person can obtain information and is, for example, about 30 degrees in the horizontal direction (in the x-y plane) and about 20 degrees in the vertical direction (in the y-z plane). The angle of the effective viewing angle is an example, and the present invention is not limited to this example and an arbitrary angle may be set. The effective viewing angel in the x-y plane is also referred to as a horizontal effective viewing angle, and the effective viewing angle in the vertical direction is also referred to as a vertical effective viewing angle.

In FIG. 12, reference sign Vex denotes a vector indicating the direction and the distance from the person p to the object on exhibition 4. The vector Vex is, for example, a vector having the coordinate (x41, y41) of the position of the person p as a start point and the coordinate (x22, y21) of the center of gravity in the x-y plane of the object on exhibition 4 as an end point. Reference sign Vsr denotes a vector indicating the direction and the distance from the person p to the screen 5. The vector Vsr is, for example, a vector having the coordinate (x41, y41) of the position of the person p as a start point and the coordinate (x12, y11) of the center of gravity in the x-y plane of the screen 5 as an end point. Reference sign Vro denotes a vector indicating the direction and the distance from the person p to the robot 1. The vector Vro is, for example, a vector having the coordinate (x41, y41) of the position of the person p as a start point and the coordinate (x32, y31) of the center of gravity in the x-y plane of the robot 1 as an end point.

The range within which the person p watches will be additionally described below.

Figure 13:
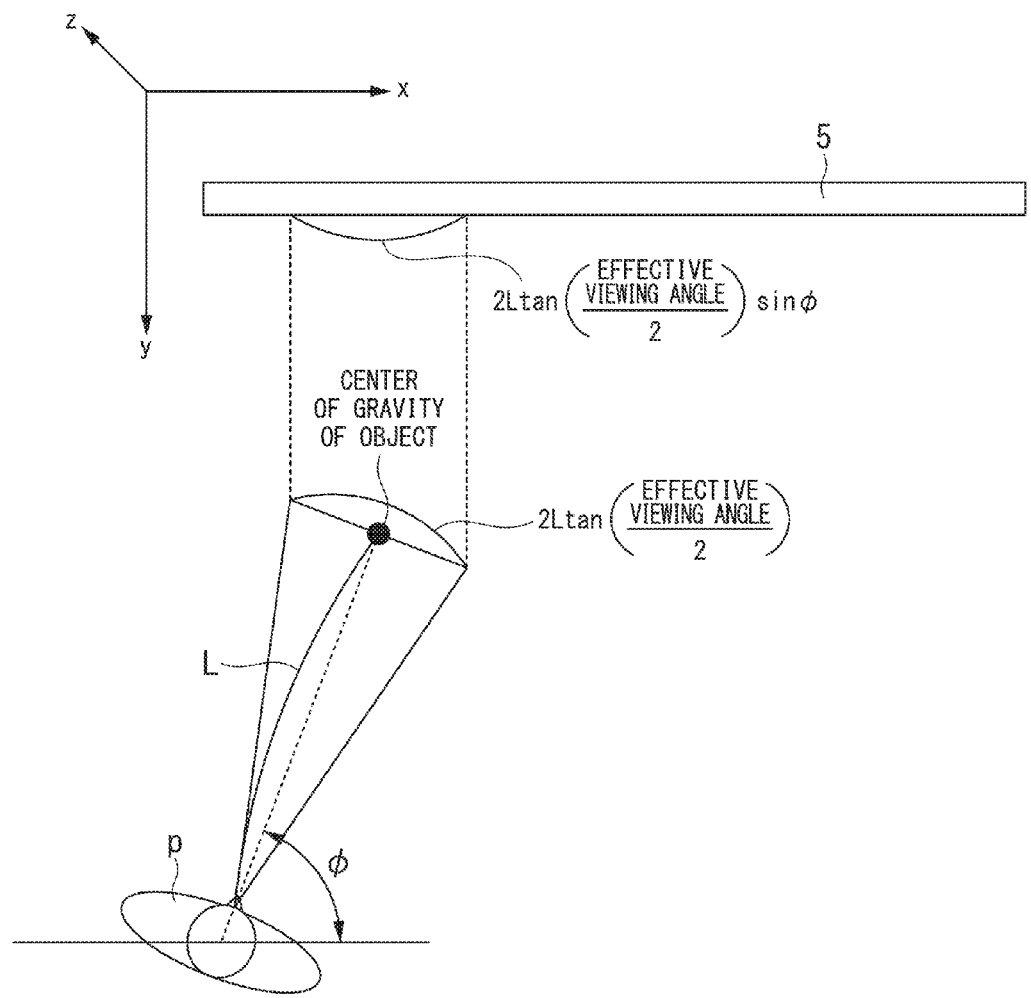
FIG. 13 is a diagram illustrating a viewing field range of a person who is watching in the x-y plane according to the first embodiment.

FIG. 13 is a diagram illustrating the range within which a person watches in the x-y plane according to this embodiment.

In FIG. 13, the angle $\phi$ is an angle of the person p with respect to the x axis. Accordingly, the angle when the person p faces the front of the screen 5 is 0 degrees, and the angle when the person p faces immediately beside the screen 5 is 90 degrees.

In the example illustrated in FIG. 13, the distance from the person p to the center of gravity of an object (also referred to as object gravity center) is defined as L. When the person p faces the front, the range within which the person p is estimated to watch in the x-y plane is expressed by Expression (1) on the basis of the effective viewing angle in the horizontal direction (on the x-y plane).

$$\text{(Watching Range)} = 2L \times \tan((\text{effective viewing angle})/2) \quad (1)$$

When the person p faces the direction of the angle $\phi$ about the x axis, the range within which the person p is estimated to watch at the angle is expressed by Expression (1). Accordingly, this range can be converted for the y-axis direction as Expression (2).

$$\text{(Watching Range)} = 2L \times \tan((\text{effective viewing angle})/2) \times \sin\phi \quad (2)$$

In this embodiment, the watching range on the x-y plane of the person p is estimated by the attention state estimating unit 40 on the basis of Expression (1) or (2).

The attention state estimating unit 40 may estimate the watching range on the y-z plane of the person p in Expression (1) or (2) using the effective viewing angle in the vertical direction in the vertical direction.

Calculation of Watching Ratio

First, a threshold value when it is determined that an object watched by the audience present in the area 6 is present and an object watched by the audience is not present in this embodiment will be described. In this embodiment, a case in which the robot 1 is an object on which the audience is desired to focus (or an object on which the audience is desired to focus is not present) and the other cases will be distinguished as follows.

(Case 1) The robot 1 is an object on which the audience is desired to focus (or an object on which the audience is desired to focus is not present)

$$1-(\text{ratio of persons watching robot 1}) = (\text{ratio of persons focusing on the others}) \quad (3)$$

In Case 1, the threshold value used to determine whether an object is watched is set to 50% on the basis of Expression (3). The attention state estimating unit 40 estimates that an object watched by the audience is not present when the "ratio of persons focusing on the others" is equal to or greater than 50% and estimates that the audience watches the robot 1 when the "ratio of persons focusing on the others" is less than 50%.

(Case 2: the other cases) An object on which the audience is desired to focus is other than the robot 1.

$$1-(\text{ratio of persons watching object on which the audience is desired to focus})-(\text{ratio of persons watching robot 1}) = (\text{ratio of persons focusing on the others}) \quad (4)$$

In Case 2, the threshold value used to determine whether an object is watched is set to 33% on the basis of Expression (4). The attention state estimating unit 40 estimates that an object watched by the audience is not present when the "ratio of persons focusing on the others" is equal to or greater than 33%. The attention state estimating unit 40 compares the ratio of persons watching an object on which the audience is desired to focus and the ratio of persons watching the robot 1 and estimates that the audience watches the object having the larger ratio when the "ratio of persons focusing on the others" is less than 33%.

The processes which are performed by the attention state estimating unit 40 and the state analyzing unit 60 will be described below.

Figure 14:
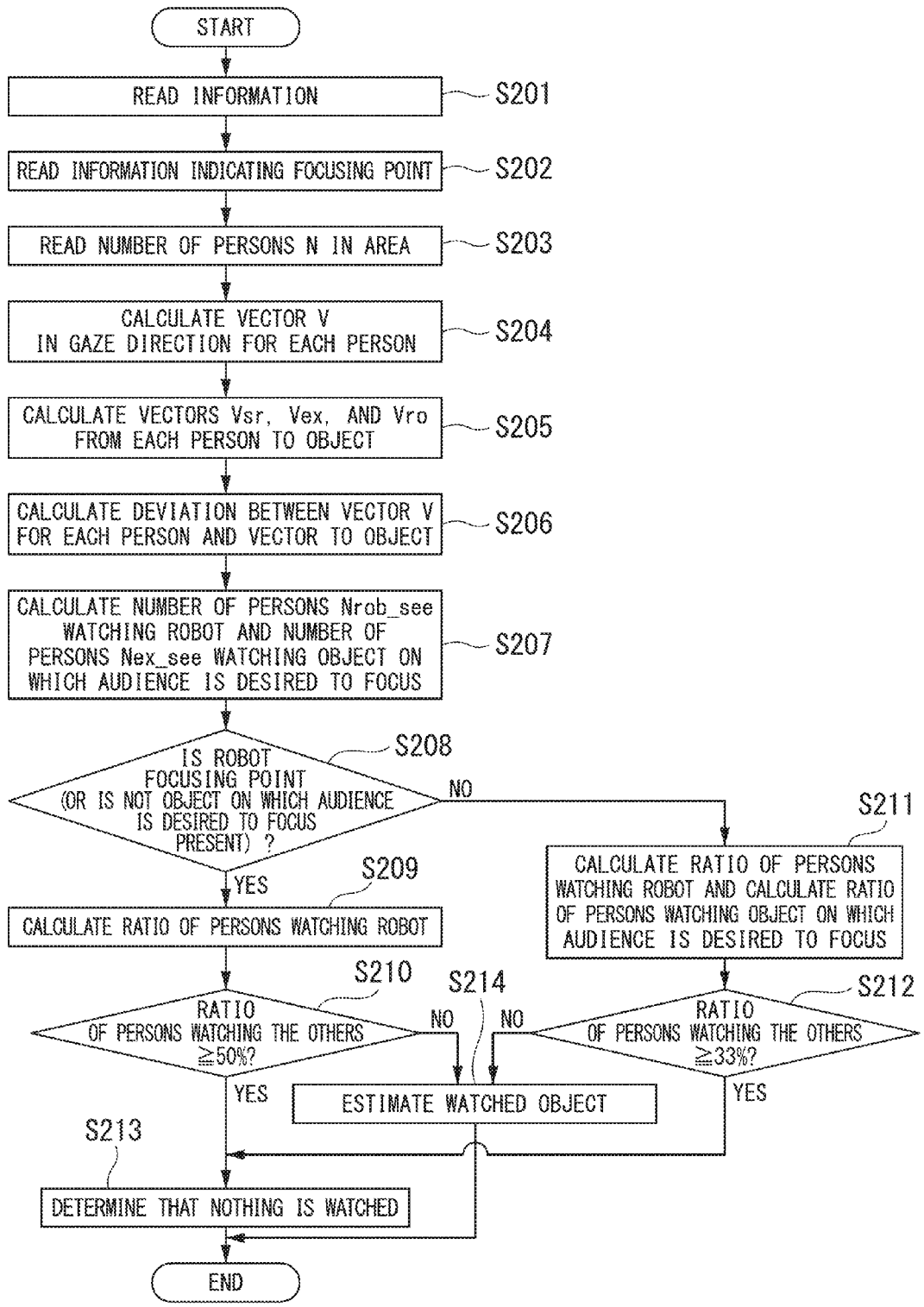
FIG. 14 is a flowchart illustrating a process flow which is performed by an attention state estimating unit according to the first embodiment.

FIG. 14 is a flowchart illustrating a process flow which is performed by the attention state estimating unit 40 according to this embodiment.

(Step S201) The attention state estimating unit 40 reads information indicating the person cluster data position for each person p and the direction of the person p from the storage unit 30. Then, the attention state estimating unit 40 reads position information of the objects from the storage unit 30. Then, the attention state estimating unit 40 extracts the coordinates of the centers of gravity in the x-y plane of the objects. The attention state estimating unit 40 moves the process flow to step S202.

(Step S202) The attention state estimating unit 40 reads information indicating the focusing point from the storage unit 30. The attention state estimating unit 40 moves the process flow to step S203.

(Step S203) The attention state estimating unit 40 reads information indicating the number of persons N in the area 6 from the storage unit 30. The attention state estimating unit 40 moves the process flow to step S204.

(Step S204) The attention state estimating unit 40 estimates the vector V indicating the gaze direction of the person p for each person p using the read information. The attention state estimating unit 40 moves the process flow to step S205.

(Step S205) The attention state estimating unit 40 calculates the vector Vsr, the vector Vex, and the vector Vro for each person p using the information indicating the person cluster data position for each person p, the direction of the person p, and the position information of the objects. The attention state estimating unit 40 moves the process flow to step S206.

(Step S206) The attention state estimating unit 40 calculates deviations between the vector V indicating the gaze direction of the person p and the vectors (Vsr, Vex, and Vro) to the objects for each person p. The attention state estimating unit 40 moves the process flow to step S207.

(Step S207) The attention state estimating unit 40 extracts the deviation in the horizontal direction that is less than 15 degrees and calculated in step S206 for each person p. Specifically, the attention state estimating unit 40 estimates that the person p mostly watches the robot 1 when the calculated value of the angle deviation (also referred to as a deviation) between the vector V and the vector Vro is less than 15 degrees (=30 degrees/2). The attention state estimating unit 40 estimates that the person p mostly watches the object on exhibition 4 when the angle deviation between the vector V and the vector Vex is less than 15 degrees. Alternatively, the attention state estimating unit 40 estimates that the person p mostly watches the screen 5 when the angle deviation between the vector V and the vector Vsr is less than 15 degrees. Then, the attention state estimating unit 40 estimates that the object having the smallest deviation among the objects estimated to be watched is an object most watched by the person p. When a plurality of objects having the same deviation are present within a predetermined range, the attention state estimating unit 40 estimates that the object closest to the person p is a watched object. Then, the attention state estimating unit 40 calculates the number of persons Nrob_see watching the robot 1 and the number of persons Nex_see watching an object on which the audience is desired to focus other than the robot 1 on the basis of the estimation result. The attention state estimating unit 40 moves the process flow to step S208.

(Step S208) The attention state estimating unit 40 determines whether the information indicating the focusing point read from the storage unit 30 indicates that the robot 1 is the focusing object or an object on which the audience is desired to focus is not present. The attention state estimating unit 40 moves the process flow to step S209 when it is determined that the robot 1 is the focusing point or an object on which the audience is desired to focus is not present (YES in step S208), and moves the process flow to step S211 otherwise (NO in step S209).

(Step S209) The attention state estimating unit 40 calculates an Nrob ratio which is a ratio (attention level) of the number of persons Nrob_see to the total number of persons N present in the area 6. The attention state estimating unit 40 moves the process flow to step S210.

(Step S210) The attention state estimating unit 40 substitutes the Nrob ratio for Expression (3) and calculates the ratio of the persons watching the others. Then, the attention state estimating unit 40 determines whether the calculated ratio of the persons watching the others is equal to or greater than 50%. The attention state estimating unit 40 moves the process flow to step S213 when it is determined that the ratio of the persons watching the others is equal to or greater than 50% (YES in step S210) and moves the process flow to step S214 when it is determined that the ratio of the persons watching the others is less than 50% (NO in step S210).

(Step S211) The attention state estimating unit 40 calculates the Nrob ratio which is a ratio of the number of persons Nrob_see to the total number of persons N present in the area 6 and the Nex ratio which is a ratio of the number of persons Nex_see to the total number of persons N present in the area 6. The attention state estimating unit 40 moves the process flow to step S212.

(Step S212) The attention state estimating unit 40 substitutes the Nrob ratio and the Nex ratio in Expression (4) and calculates the ratio of the person watching the others. Then, the attention state estimating unit 40 determines whether the calculated ratio of the persons watching the others is equal to or greater than 33%. The attention state estimating unit 40 moves the process flow to step S213 when it is determined that the calculated ratio of the persons watching the others is equal to or greater than 33% (YES in step S212) and moves the process flow to step S214 when it is determined that the calculated ratio of the persons watching the others is less than 33% (NO in step S212).

(Step S213) The attention state estimating unit 40 determines that the audience in the area 6 watches no object and ends the process flow.

(Step S214) The attention state estimating unit 40 estimates that the audience watches the robot 1 when the determination result of step S210 is less than 50%.

When the determination result of step S212 is less than 33%, the attention state estimating unit 40 compares the Nrob ratio and the Nex ratio. Then, when the Nrob ratio is greater than the Nex ratio as the comparison result, the attention state estimating unit 40 estimates that the audience watches the robot 1. Alternatively, when the Nex ratio is greater than the Nrob ratio as the comparison result, the attention state estimating unit 40 estimates that the audience watches the focusing point other than the robot 1. When it is estimated that the audience watches the focusing point other than the robot 1, the attention state estimating unit 40 estimates whether the object watched by the audience is the object on exhibition 4 or the screen 5 on the basis of the deviations calculated in step S207. In this embodiment, the estimation result estimated by the attention state estimating unit 40 is set as the object most watched by the audience. Then, the attention state estimating unit 40 outputs the estimation result to the state analyzing unit 60.

The attention state estimating unit 40 performs the processes of steps S201 to S214 at every predetermined time. The predetermined time is, for example, at every 100 [msec].

The process flow which is performed by the attention state estimating unit 40 ends in this way.

The ratio 50% used in step S210 and the ratio 33% used in step S212 are examples, and the present invention is not limited to these examples. The threshold value is not limited to 50% or 33%, but may be a value obtained through experiments or the like or may be a predetermined other value. For example, the threshold value may be a value depending on the number of questions when the corresponding explanatory note is a multiple choice question or may be a value depending on the number of persons present in the area 6.

State Analysis

The process flow which is performed by the state analyzing unit 60 will be described below.

Figure 15:
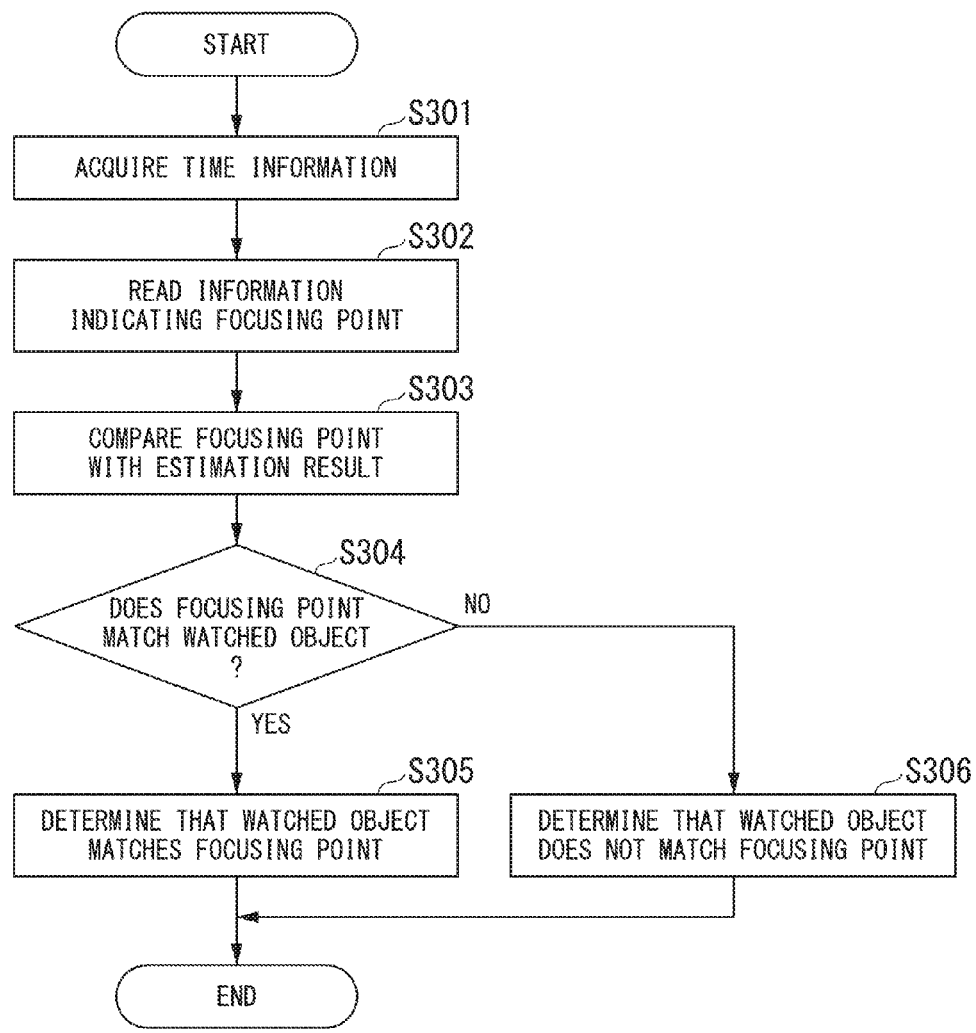
FIG. 15 is a flowchart illustrating a process flow which is performed by a state analyzing unit according to the first embodiment.

FIG. 15 is a flowchart illustrating the process flow which is performed by the state analyzing unit 60 according to this embodiment.

(Step S301) The state analyzing unit 60 acquires time information input from the timer unit 10. The state analyzing unit 60 moves the process flow to step S302.

(Step S302) The state analyzing unit 60 reads information indicating the focusing point correlated with the time based on the acquired time information from the scenario storage unit 50. The state analyzing unit 60 moves the process flow to step S303.

(Step S303) The state analyzing unit 60 compares the information indicating the focusing point read from the scenario storage unit 50 with the estimation result input from the attention state estimating unit 40. The state analyzing unit 60 moves the process flow to step S304.

(Step S304) The state analyzing unit 60 determines whether the most watched object included in the estimation result matches the focusing point. The state analyzing unit 60 moves the process flow to step S305 when it is determined that the most watched object matches the focusing point (YES in step S304) and moves the process flow to step S306 when it is determined that the most watched object does not match the focusing point (NO in step S304).

(Step S305) The state analyzing unit 60 determines that the most watched object matches the focusing point. Then, the state analyzing unit 60 outputs the determination result to the attention level changing and setting unit 70 and ends the process flow.

(Step S306) The state analyzing unit 60 determines that the most watched object does not match the focusing point. Then, the state analyzing unit 60 outputs the determination result to the attention level changing and setting unit 70 and ends the process flow.

The state analyzing unit 60 performs the processes of steps S301 to S306 at every predetermined time. The predetermined time is, for example, at every 100 [msec].

In the example illustrated in FIG. 15, the Nrob ratio which is the ratio of the persons watching the robot 1 and the Nex ratio which is the ratio of the persons watching the others are used, but the present invention is not limited to this example. The state analyzing unit 60 may estimate the object watched by the audience using the number of persons Nobj_see watching the object on exhibition 4 and an Nobj ratio which is a ratio of the persons watching the object on exhibition 4, the number of persons Nsr_see watching the screen 5 and an Nsr ratio which is a ratio of the persons watching the screen 5, and the number of persons Non_see not watching the objects, and an Nnon ratio which is a ratio of the persons not watching the objects.

Changing and Setting of Attention Level and Action Plan

An example of the process flow which is performed by the attention level changing and setting unit 70, the action planning unit 80, and the action control unit 90 will be described below.

Figure 16:
FIG. 16 is a diagram illustrating examples of a focusing point stored in the scenario storage unit and an object watched by the audience present in an area 6 at times t0 to t6.

FIG. 16 is a diagram illustrating examples of the focusing point stored in the scenario storage unit 50 and an object watched by the audience present in the area 6 at times t0 to t6. In the example illustrated in FIG. 16, the object watched by the audience present in the area 6 is an object watched by 50% or more of the audience present in the area 6. The time interval between time t0 and time t1 is, for example, 10 seconds.

Figure 17:
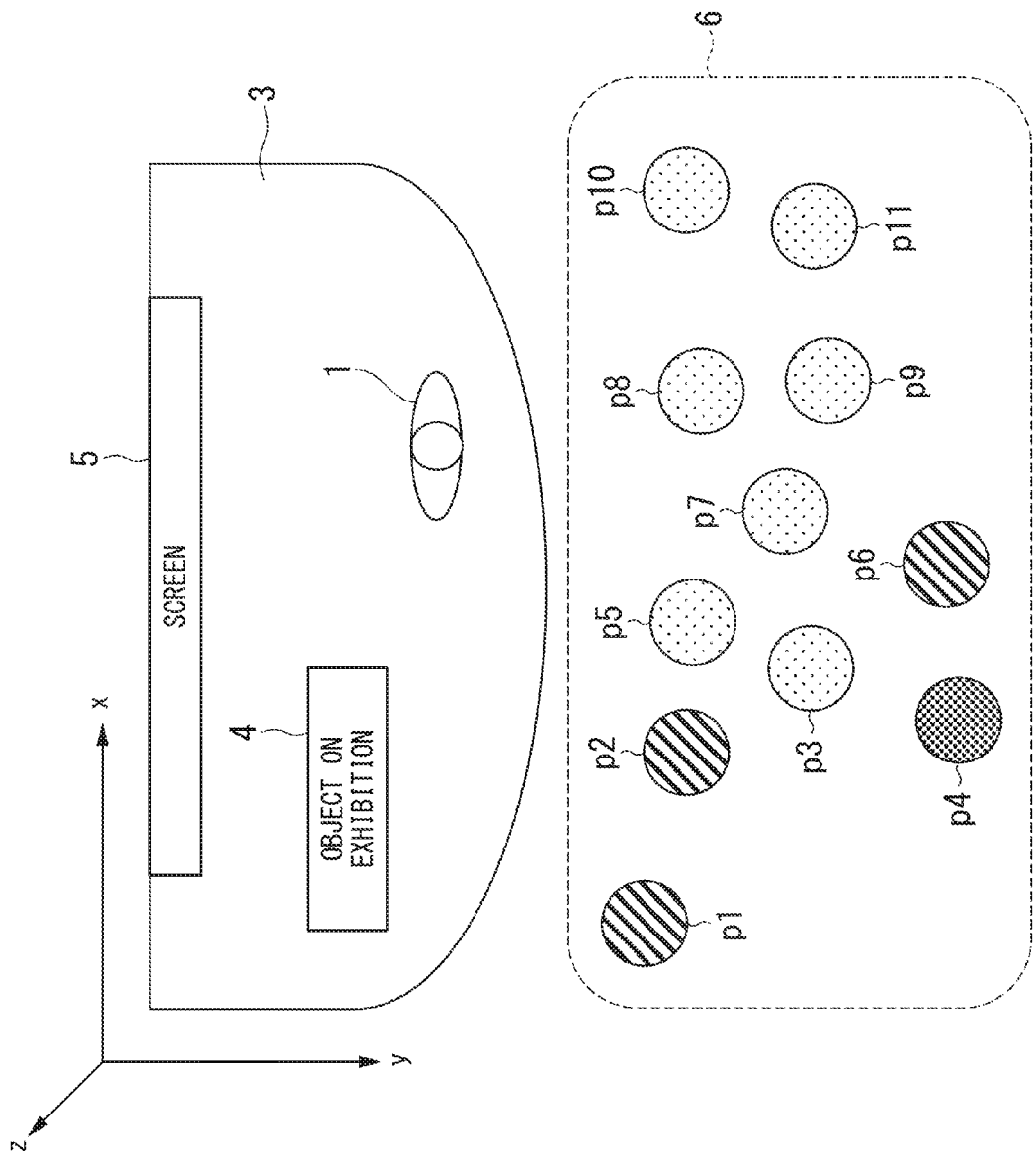
FIG. 17 is a diagram illustrating attention levels of persons present in an area at time t1.

FIG. 17 is a diagram illustrating attention levels of the persons present in the area 6 at time t1.

In the example illustrated in FIG. 16, column information in the area denoted by reference numeral 201 is information of the focusing point at each time stored in the scenario storage unit 50 described with reference to FIG. 7. The column information in the area denoted by reference numeral 202 is information indicating the objects at each time watched by the audience in the area 6. In this example, at times t0, t2, t3, t5, and t6, the focusing point in the scenario matches the object watched by the audience. At times t1 and t4, the focusing point in the scenario does not match the object watched by the audience.

In the example illustrated in FIG. 17, at time t1, eleven persons p1 to p11 are present in the area 6. Among the persons present in the area 6, the number of persons Nsr_see mostly watching the screen 5 is three (person p1, person p2, and person p6), the number of persons Nobj_see mostly watching the object on exhibition 4 is one (person p4), and the number of persons Nrob_see mostly watching the robot 1 is seven (person p3, person p5, and persons p7 to p11). Accordingly, at time t1, the Nrob ratio for mostly watching the robot 1 is about 63.6% ($=7/11 \times 100$), the Nobj ratio for mostly watching the object on exhibition 4 is about 9.1% ($=1/11, \times 100$), and the Nsr ratio for mostly watching the screen 5 is about 27.3% ($=3/11 \times 100$). The number of persons Nnon_see not watching any object is zero, and the Nnon ratio not watching any object is 0%. Since the Nrob ratio most watching the robot 1 is the largest and greater than 50%, the state analyzing unit 60 determines that the object most watched by the audience is the robot 1 and does not match the focusing point. That is, the Nrob ratio, the Nex ratio, the Nsr ratio, and the Nrob ratio are attention levels to the objects.

In this embodiment, the ratios are calculated in percentage but may be merely calculated in proportion.

At time t1, since the focusing point on which the audience is desired to focus does not match the watched object, the attention level changing and setting unit 70 needs to change the object watched by the persons from the robot 1 to the screen 5 between time t1 and time t2.

Accordingly, the attention level changing and setting unit 70 determines whether to increase the attention level to the robot 1 or decrease the attention level to the robot 1. The attention level changing and setting unit 70 determines if the robot 1 is a waypoint to an object on which the audience is desired to focus, the robot 1 is an object on which the audience is desired to focus, an object on which the audience is desired to focus is other than the robot 1, or an object on which the audience is desired to focus is not present on the basis of the input information indicating the focusing point.

When one of information set indicating that the robot 1 is a waypoint, information set indicating that the robot 1 is an object on which the audience is desired to focus, information set indicating that an object on which the audience is desired to focus is other than the robot 1, and information set indicating that an object on which the audience is desired to focus is not present is input from the attention level changing and setting unit 70, the action planning unit 80 selects a corresponding candidate action from the scenario storage unit 50. The action planning unit 80 determines the selected candidate action as an action plan.

At time t1, since an object on which the audience is desired to focus is present, the action planning unit 80 selects an action from the actions for decreasing the attention level to the robot 1 such as pointing an object such as the object on exhibition 4 or the screen 5, calling a name (or a title) of an object, approaching an object, holding and showing an object, or approaching the audience with an object carried. The action planning unit 80 selects a candidate action that is suitable in that the explanation cannot be interrupted or stopped midway. Examples of the action that can interrupt an explanation include suddenly running or hopping, for example, while the object on exhibition 4 is being explained.

When a plurality of candidate actions are present, the action planning unit 80 preferentially selects an action not accompanied with a leg movement of the robot 1. When a plurality of candidate actions in the same column are present, the action planning unit 80 randomly selects one candidate action. Alternatively, the attention level changing and setting unit 70 may sequentially select a candidate action in the order stored in the scenario storage unit 50.

Figure 18:
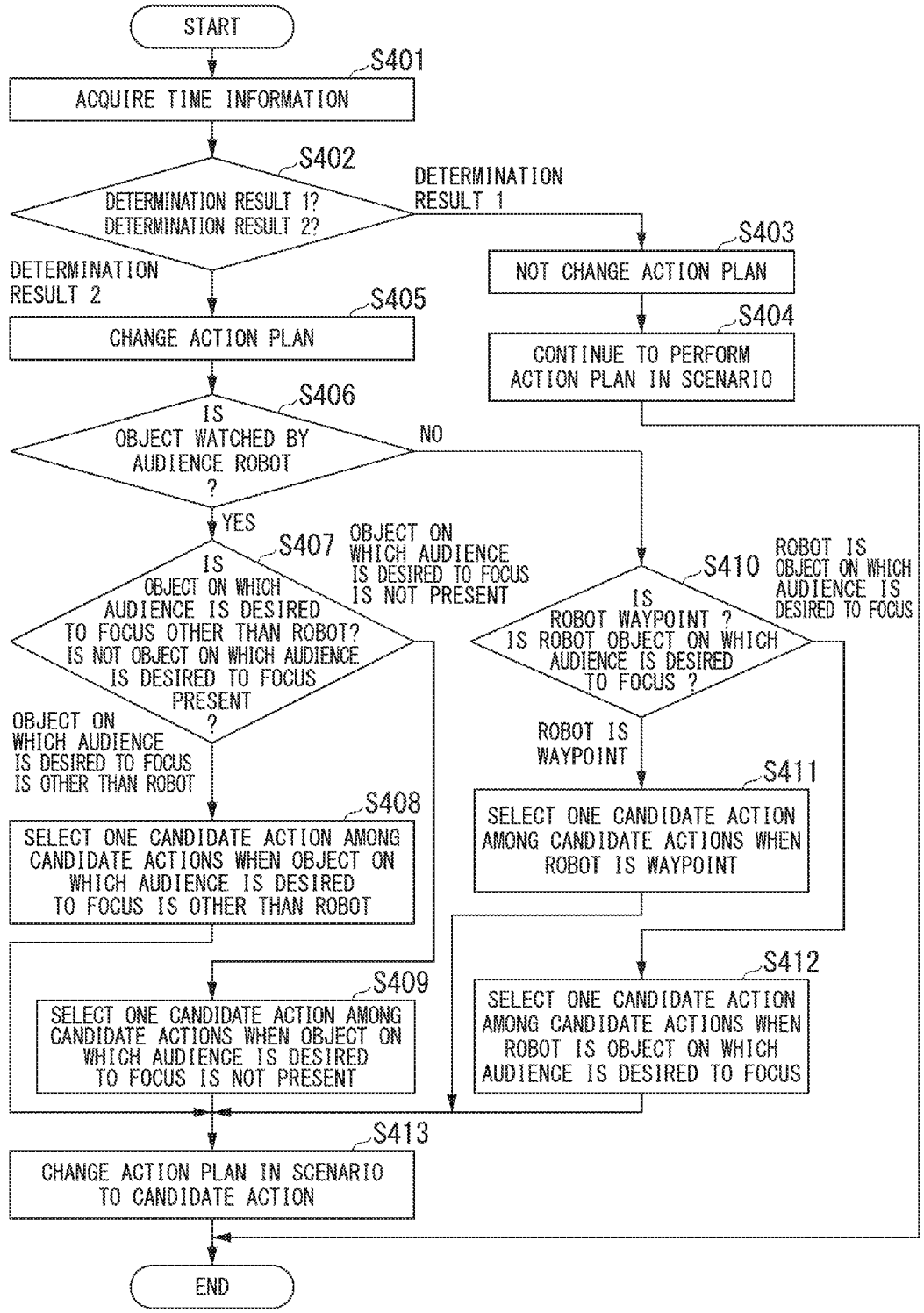
FIG. 18 is a flowchart illustrating a flow of an attention level changing process and a candidate action selecting process according to the first embodiment.

FIG. 18 is a flowchart illustrating a flow of an attention level changing process and a candidate action selecting process according to this embodiment.

(Step S401) The attention level changing and setting unit 70 acquires time information input from the timer unit 10. The attention level changing and setting unit 70 moves the process flow to step S402.

(Step S402) The attention level changing and setting unit 70 determines whether the determination result input from the state analyzing unit 60 is determination result 1 or determination result 2. The attention level changing and setting unit 70 moves the process flow to step S403 when it is determined that the input determination result is determination result 1 (determination result 1 in step S402) and moves the process flow to step S405 when it is determined that the input determination result is determination result 2 (determination result 2 in step S402).

(Step S403) Since the focusing point in the scenario matches the object most watched by the audience, the attention level changing and setting unit 70 does not change the action plan. Then, the attention level changing and setting unit 70 outputs non-changing information indicating that the action plan is not changed to the action planning unit 80 and moves the process flow to step S404.

(Step S404) Information indicating that the attention level is not changed is input to the action planning unit 80 from the attention level changing and setting unit 70. Then, the action planning unit 80 continues to perform the scenario (generation of an explanatory note, an action, and the like) at that time stored in the scenario storage unit 50. The action planning unit 80 ends the process flow.

(Step S405) Since the focusing point in the scenario does not match the object most watched by the audience, the attention level changing and setting unit 70 determines that the action plan should be changed. The attention level changing and setting unit 70 moves the process flow to step S406.

(Step S406) The attention level changing and setting unit 70 determines whether the object most watched by the audience is the robot 1. The attention level changing and setting unit 70 moves the process flow to step S407 when it is determined that the object most watched by the audience is the robot 1 (YES in step S406) and moves the process flow to step S410 when it is determined that the object most watched by the audience is other than the robot 1 (NO in step S406).

(Step S407) In order to select a candidate action among actions for decreasing the attention level to the robot 1, the attention level changing and setting unit 70 determines whether an object which the audience is desired to watch is other than the robot 1 or an object which the audience is desired to watch is not present on the basis of the information stored in the scenario storage unit 50. When it is determined that an object which the audience is desired to watch is other than the robot 1 (an object which the audience is desired to watch is other than the robot in step S407), the attention level changing and setting unit 70 outputs the determination result to the action planning unit 80 and moves the process flow to step S408. Alternatively, when it is determined that an object which the audience is desired to watch is not present (an object which the audience is desired to watch is not present in step S407), the attention level changing and setting unit 70 outputs the determination result to the action planning unit 80 and moves the process flow to step S409.

(Step S408) The action planning unit 80 selects a candidate action among the candidate actions when an object which the audience is desired to watch is other than the robot 1 and moves the process flow to step S413.

(Step S409) The action planning unit 80 selects a candidate action among the candidate actions when an object which the audience is desired to watch is not present and moves the process flow to step S413.

(Step S410) In order to select an candidate action among the actions for increasing the attention level to the robot 1, the attention level changing and setting unit 70 determines whether the robot 1 is a waypoint or the robot 1 is an object which the audience is desired to watch on the basis of the information stored in the scenario storage unit 50.

When it is determined that the robot 1 is a waypoint (the robot is a waypoint in step S410), the attention level changing and setting unit 70 outputs the determination result to the action planning unit 80 and moves the process flow to step S411. Alternatively, when it is determined that the robot 1 is an object which the audience is desired to watch (the robot is an object which the audience is desired to watch in step S410), the attention level changing and setting unit 70 outputs the determination result to the action planning unit 80 and moves the process flow to step S412.

(Step S411) The action planning unit 80 selects a candidate action among the candidate actions when the robot 1 is a waypoint and moves the process flow to step S413.

(Step S412) The action planning unit 80 selects a candidate action among the candidate actions when the robot 1 is an object which the audience is desired to watch and moves the process flow to step S413.

(Step S413) The action planning unit 80 changes the action plan stored in the scenario storage unit 50 to the candidate action selected in step S408, S409, S411, or S412. Then, the action control unit 90 controls the utterance, the action, and the like of the robot 1 on the basis of the information indicating the candidate action input from the action planning unit 80. The action control unit 90 ends the process flow.

The attention level changing and setting unit 70 and the action planning unit 80 perform the above-mentioned process flow at every predetermined time. The changing of the action plan stored in the scenario storage unit 50 means changing the action plan including the corresponding explanatory note and the scheduled moving position of the robot 1 for each time stored in the scenario storage unit 50 to the explanatory note or the scheduled moving position of the robot 1 based on the selected candidate action as illustrated in FIG. 7.

As described above, the autonomous moving device (for example, the robot 1) according to this embodiment includes: a measuring unit (for example, the sensor 2 and the measuring unit 20) configured to measure a position and a posture of a person who is present in a predetermined area (for example, the area 6); an attention state estimating unit (for example, the attention state estimating unit 40) configured to estimate a first attention state (for example, a state in which the person watches an object and the direction on the x-y plane of the person) of the person on the basis of information indicating the position and the posture of the person measured by the measuring unit; a state analyzing unit (for example, the state analyzing unit 60 and the attention level changing and setting unit 70) configured to determine a corrective course of action for correcting the first attention state on the basis of the estimated first attention state and a predetermined second attention state (for example, the focusing point); and an action planning unit (for example, the action planning unit 80) configured to determine an action corresponding to the determined corrective course of action.

According to this configuration, the robot 1 according to this embodiment estimates a state in which the audience watches an object and compares the estimated object with a state in which the audience is desired to focus on a predetermined focusing point.

When the focusing point does not match the object, the robot 1 determines a corrective course of action for correcting the action plan on the basis of the focusing point and the determination result input from the state analyzing unit 60. The corrective course of action includes a course of action to not correct the action plan as described above.

Accordingly, when the focusing point does not match the object watched by the audience, the robot 1 can change the watching of the audience from the object by performing an action corresponding to the corrective course of action for changing the watching on the object watched by the audience. As a result, according to this embodiment, it is possible to change an object watched by the audience.

In the autonomous moving device (for example, the robot 1) according to this embodiment, the attention state estimating unit (for example, the attention state estimating unit 40) estimates a gaze direction (for example, the object watched by the person and the direction on the x-y plane of the person) in which the person present in the predetermined area (for example, the area 6) watches as the first attention state on the basis of the information indicating the posture measured by the measuring unit (for example, the sensor 2 and the measuring unit 20).

According to this configuration, since the robot 1 according to this embodiment estimates the gaze direction in which the person watches on the basis of the posture, it is possible to estimate the direction in which the audience looks with a small computational load. Accordingly, even when a plurality of persons are present in the predetermined area, to the robot 1 according to this embodiment can estimate the gaze directions of the persons with a small computational load.

In the autonomous moving device (for example, the robot 1) according to this embodiment, the second attention state includes a position of a focusing object which is an object which the person is desired to watch and information indicating the focusing object (for example, the focusing point), and the attention state estimating unit (for example, the attention state estimating unit 40) compares the estimated gaze direction (for example, the vector V) with a focusing direction (for example, the vector Vrob, the vector Vex, or the vector Vsr) from the person to the focusing object and determines whether the person focuses on the focusing object on the basis of the comparison result.

According to this configuration, since the robot 1 according to this embodiment compares the focusing direction from the person to the focusing object with the gaze direction and determines whether the person watches the focusing point on the basis of the comparison result, it is possible to determine whether the object watched by the person matches the focusing point.

In the autonomous moving device (for example, the robot 1) according to this embodiment, the attention state estimating unit (for example, the attention state estimating unit 40) estimates focusing directions (for example, the vector Vrob, the vector Vex, or the vector Vsr) of the person to a plurality of the objects when the plurality of objects (for example, the robot 1, the object on exhibition 4, the screen 5, or the others) are present, calculates angle differences between the gaze direction (for example, the vector V) and the focusing directions, and estimates the object corresponding to the focusing direction having the smallest angle difference among the calculated angle differences as the object which the person mostly watches.

According to this configuration, when a plurality of objects are present on the stage 3, the robot 1 according to this embodiment calculates the deviation between the vector V and the vector Vrob, the deviation between the vector and the vector Vex, and the deviation between the vector V and the vector Vex. In this way, according to this embodiment, the deviations between the vector V indicating the gaze direction of a person and the vector Vrob, the vector Vex, and the vector Vsr for the objects are calculated and the object having the smallest deviation is estimated to be the object watched by the person. As a result, according to this embodiment, it is possible to estimate the object which is most watched by the persons on the basis of the deviations between the vectors.

In the autonomous moving device (for example, the robot 1) according to this embodiment, the attention state estimating unit (for example, the attention state estimating unit 40) estimates that the person watches the object when the position of the object having a smallest angle difference among the calculated angle differences is within the person's effective viewing angle (for example, ±15 degrees in the horizontal direction and ±10 degrees in the vertical direction).

According to this configuration, since the robot 1 according to this embodiment is based on visual characteristics of persons, it is possible to accurately estimate an object which is most watched by the persons.

In the autonomous moving device (for example, the robot 1) according to this embodiment, the attention state estimating unit (for example, the attention state estimating unit 40) estimates that the object (for example, the robot 1, the object on exhibition 4, the screen 5, or others) watched by each of the plurality of persons who are present in the predetermined area (for example, the area 6) is the first attention state, and the attention state estimating unit calculates a ratio (for example, the Nrob ratio, the Nobj ratio, the Nex ratio, or the Nsr ratio) of the persons watching the object among the plurality of persons for each object and estimates the object watched by the plurality of persons who are present in the predetermined area depending on the calculated ratios.

According to this configuration, even when a plurality of persons present in the area 6 watch different objects, the robot 1 according to this embodiment can estimate the object most watched by the plurality of persons present in the area 6.

In the autonomous moving device (for example, the robot 1) according to this embodiment, the state analyzing unit (for example, the state analyzing unit 60 or the attention level changing and setting unit 70) compares the object (for example, the robot 1, the object on exhibition 4, the screen 5, or others) estimated by the attention state estimating unit (for example, the attention state estimating unit 40) with the focusing object (for example, the focusing point) and determines whether the persons of a predetermined ratio (for example, 33% or 50%) or more among the plurality of persons who are present in the predetermined area (for example, the area 6) watch the focusing object.

According to this configuration, even when a plurality of persons present in the area 6 watch different objects, the robot 1 according to this embodiment can determine whether the object most watched by the plurality of persons present in the area 6 matches the focusing point.

In the autonomous moving device (for example, the robot 1) according to this embodiment, the state analyzing unit (for example, the state analyzing unit 60 or the attention level changing and setting unit 70) determines the corrective course of action for correcting the attention state to change the gaze direction (for example, the vector V) when the ratio of the persons not watching the focusing object (for example, the focusing point) is equal to or greater than the predetermined ratio.

According to this configuration, when the object most watched by the plurality of persons present in the area 6 does not match the focusing point, the robot 1 according to this embodiment can determine the corrective course of action for correcting the attention state to change the gaze direction.

In the autonomous moving device (for example, the robot 1) according to this embodiment, the state analyzing unit (for example, the state analyzing unit 60 or the attention level changing and setting unit 70) determines whether to increase the ratio of the persons watching the autonomous moving device or whether to decrease the ratio of the persons watching the autonomous moving device among the plurality of persons who are present in the predetermined area (for example, the area 6) depending on the object watched by the persons making up the predetermined ratio or more and the focusing object (for example, the focusing point) when it is determined that the persons do not watch the object (for example, the robot 1, the object on exhibition 4, the screen 5, or others).

According to this configuration, when the object watched by the plurality of persons present in the area 6 does not match the focusing point, the robot 1 according to this embodiment can determine whether to increase the ratio of the persons watching the robot 1 or whether to decrease the ratio of the persons watching the robot 1 depending on the object watched by the plurality of persons and the focusing point.

In the autonomous moving device (for example, the robot 1) according to this embodiment, the state analyzing unit (for example, the state analyzing unit 60 or the attention level changing and setting unit 70) determines whether to change the ratio of the persons watching the focusing object via the autonomous moving device or whether to change the ratio of the persons watching the autonomous moving device which is the focusing object as the corrective course of action depending on the object (for example, the robot 1, the object on exhibition 4, the screen 5, or others) watched by the persons making up the predetermined ratio or more and the focusing object (for example, the focusing point) when it is determined that the ratio of the persons watching the autonomous moving device should be increased.

According to this configuration, when the object watched by the plurality of persons present in the area 6 does not match the focusing point, the robot 1 according to this embodiment determines whether to change the ratio of the persons watching the focusing point via the robot 1 or whether the robot 1 is the focusing point on which the persons are desired to focus as the corrective course of action depending on the object watched by the plurality of persons and the focusing point.

In the autonomous moving device (for example, the robot 1) according to this embodiment, the state analyzing unit (for example, the state analyzing unit 60 or the attention level changing and setting unit 70) determines whether to change the ratio of the persons watching the focusing object when the object on which the persons are desired to focus is set or whether to change the ratio of the persons watching the object when the focusing object on which the persons are desired to focus is not set as the corrective course of action depending on the object watched by the persons making up the predetermined ratio or more and the focusing object when it is determined that the ratio of the persons watching the autonomous moving device should be decreased.

According to this configuration, when the object watched by the plurality of persons present in the area 6 does not match the focusing point, the robot 1 according to this embodiment can determine whether an object on which the persons are desired to focus is present or whether an object on which the persons are desired to focus is not present as the corrective course of action depending on the object watched by the plurality of persons and the focusing point.

The autonomous moving device (for example, the robot 1) according to this embodiment further includes an action storage unit (for example, the scenario storage unit 50) configured to store candidate actions on the basis of the corrective course of action in advance, and the action planning unit (for example, the action planning unit 80) selects one of the candidate actions stored in the action storage unit depending on the corrective course of action determined by the state analyzing unit (for example, the state analyzing unit 60 or the attention level changing and setting unit 70).

According to this configuration, the robot 1 according to this embodiment selects one candidate action among the candidate actions stored in the scenario storage unit 50. The robot 1 can determine an action corresponding to the candidate action selected by the action planning unit 80 as an action plan.

In the autonomous moving device (for example, the robot 1) according to this embodiment, the action planning unit (for example, the action planning unit 80) preferentially selects the candidate action which does not interfere with a predetermined action of the autonomous moving device.

According to this configuration, the robot 1 according to this embodiment can select a candidate action that does not interfere with the action of the robot 1. In the autonomous moving device (for example, the robot 1) according to this embodiment, the action planning unit (for example, the action planning unit 80) preferentially selects the candidate action which does not accompany movement of the autonomous moving device.

According to this configuration, since a candidate action accompanied with movement with a high operation cost can be set to a low selection priority, the robot 1 according to this embodiment can effectively utilize electric power of a power supply of the robot 1.

In this embodiment, the vector of the object watched by the audience is generated on the x-y plane as illustrated in FIG. 12, but the present invention is not limited to this configuration.

Figure 19:
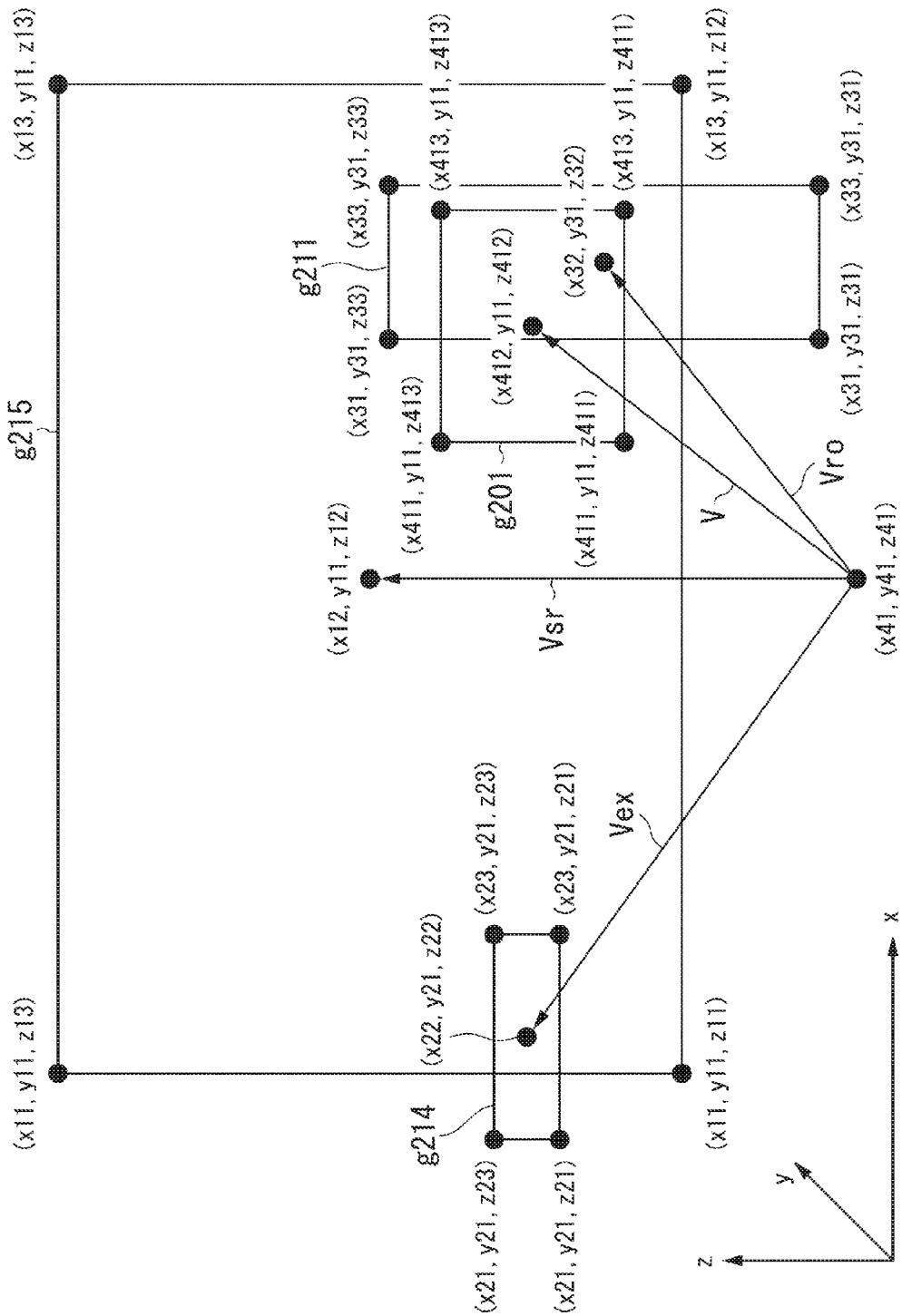
FIG. 19 is a diagram illustrating an example of a viewing field range based on vectors and an effective viewing angle of a person according to the first embodiment.

FIG. 19 is a diagram illustrating an example of a viewing field range based on vectors and an effective viewing angle of a person according to this embodiment. The coordinate system in FIG. 19 is the same as FIG. 1.

In FIG. 19, an area indicated by reference sign g201 is an area of the viewing field range of the person p, and an area indicated by reference sign g211 is an area within which the robot 1 is present. An area indicated by reference sign g214 is an area within which the object on exhibition 4 is placed, and an area indicated by reference sign g215 is an area within which the screen 5 is disposed. It is assumed that the person p is present at a position (x41, y41) in the x-y plane and the position of the nose tip of the person p is (x41, y41, and z41).

In this case, the vector Vex is, for example, a vector having the coordinate (x41, y41, z41) of the position of the person p as a start point and having the coordinate (x22, y21, z21) of the center of gravity on the x-y plane of the object on exhibition 4 as an end point. The vector Vsr is, for example, a vector having the coordinate (x41, y41, z41) of the position of the person p as a start point and having the coordinate (x12, y11, z12) of the center of gravity of the screen 5 as an end point. The vector Vro is, for example, a vector having the coordinate (x41, y41, z41) of the position of the person p as a start point and having the coordinate (x32, y31, z31) of the center of gravity of the robot 1 as an end point.

For example, when the height of the stage 3 is equal to the height of the floor, it is assumed that the audience looks in a direction parallel to the floor and an effective viewing angle in the vertical direction (on the y-z plane) is 20 degrees with respect to the horizontal plane parallel to the floor. The attention state estimating unit 40 calculates the vector V indicating the direction in which the person p looks under the assumption that the person p looks in the horizontal direction. The attention state estimating unit 40 calculates the deviations from the vectors (Vsr, Vex, and Vro) to the objects for each person p. The attention state estimating unit 40 extracts the deviation which is less than 30 degrees in the horizontal direction and less than 20 degrees in the vertical direction and which is calculated in step S206 (FIG. 13). Specifically, the attention state estimating unit 40 estimates that the person p watches the robot 1 when the value of the angle deviation in the horizontal direction between the vector V and the vector Vro is less than 15 degrees (=30 degrees/2) and the angle deviation therebetween in the vertical direction is less than 10 degrees (=20 degrees/2). Alternatively, the attention state estimating unit 40 estimates that the person p watches the object on exhibition 4 when the angle deviation in the horizontal direction between the vector V and the vector Vex is less than 15 degrees and the angle deviation therebetween in the vertical direction is less than 10 degrees. Alternatively, the attention state estimating unit 40 estimates that the person p watches the screen 5 when the angle deviation in the horizontal between the vector V and the vector Vsr is less than 15 degrees and the angle deviation therebetween in the vertical direction is less than 10 degrees. Then, the attention state estimating unit 40 estimates that the object having the smallest deviation among the objects estimated to be watched is an object most watched by the person p. When a plurality of objects having the same deviation are present within a predetermined range, the attention state estimating unit 40 estimates that the object closer to the person p is a watched object.

For example, when the stage 3 is higher than the floor, the audience looks up at the objects (the robot 1, the object on exhibition 4, and the screen 5) on the stage 3. Accordingly, an angle at which the audience looks up at the objects on the stage 3 may be measured in advance and may be stored in the storage unit 30. The attention state estimating unit 40 may add the looking-up angle stored in the storage unit 30 to the effective viewing angle in the vertical direction and may estimate the vector V indicating the direction in which a person p looks using the added value.

On the contrary, when the stage 3 is lower than the floor, an angle at which the audience looks down at the objects on the stage 3 may be measured in advance and may be stored in the storage unit 30. The attention state estimating unit 40 may add the down-looking angle stored in the storage unit 30 to the effective viewing angle in the vertical direction and may estimate the vector V indicating the direction in which a person p looks using the added value.

In this embodiment, the attention state estimating unit 40 estimates the object watched by a person p on the basis of the deviations between the vector V indicating the direction in which the person p looks and the vectors (Vsr, Vex, and Vro) to the objects, but the present invention is not limited to this example.

The attention state estimating unit 40 may calculate areas of the objects denoted by reference signs g211, g214, and g215 in FIG. 19 on the basis of the coordinates of four corners of each object and the coordinate of the center of gravity thereof which are stored in the storage unit 30. Provisionally, the end point of the sight line of the person p is set to the coordinate value (y11) of the position in the y-axis direction on the screen 5 located at the deepest side of the stage 3. Accordingly, attention state estimating unit 40 estimates that the coordinate of the end point of the sight line of the person p is (x412, y11, z412). Then, the attention state estimating unit 40 may calculate the area of the viewing field range of the person p denoted by reference sign g201 on the basis of the effective viewing angle of the person. Then, the attention state estimating unit 40 may compare the calculated areas and estimate that the object in which the areas overlap is the object watched by the person p. In this case, when a plurality of objects having the same deviation are present in a predetermined range, the attention state estimating unit 40 estimates that the object closer to the person p is a watched object.

In the example illustrated in FIG. 19, the viewing field range and the areas of the objects are in the x-z plane, but the object watched by the person p may be estimated through the above-mentioned process in the x-axis direction.

The attention state estimating unit 40 calculates the area in the x-axis direction in which the robot 1 is disposed to range from (x31) to (x33) on the basis of the coordinates of four corners of each object and the coordinate of the center of gravity which are stored in the storage unit 30 as in the example illustrated in FIG. 12. The attention state estimating unit 40 may calculate the area in the x-axis direction in which the object on exhibition 4 is disposed to range from (x21) to (x23) and may calculate the area in the x-axis direction in which the screen 5 is disposed to range from (x11) to (x13). The attention state estimating unit 40 may calculate the area in the x-axis direction of the person p to range (x12+α) to (x12−α) (where α is a value calculated on the basis of the effective viewing angle±15 degrees in the horizontal direction) on the basis of the effective viewing angle in the horizontal direction. Then, the attention state estimating unit 40 may compare the calculated areas and estimate that the object in which the areas overlap is the object watched by the person p. In this case, when a plurality of objects having the same deviation are present in a predetermined range, the attention state estimating unit 40 estimates that the object closer to the person p is a watched object.

In this embodiment, the robot 1 includes two storage units of the storage unit 30 and the scenario storage unit 50, but may include one of the two storage units to store all the information of both storage units.

In this embodiment, the robot 1, the object on exhibition 4, and the screen 5 are present as objects on the stage 3 which the audience is desired to watch, but the present invention is not limited to this example. For example, a plurality of objects on exhibition 4 or a plurality of screens 5 may be present, or another object may be present on the stage 3. In this case, position information of the objects may be stored in the storage unit 30 and the attention state estimating unit 40 may calculate the vectors for each object.

In this embodiment, the attention state estimating unit 40 calculates the vector Vsr, the vector Vex, and the vector Vro, but the present invention is not limited to this example. The attention state estimating unit 40 may determine an object corresponding to the focusing point and calculate only the vector for the determined object. In this case, the attention state estimating unit 40 may calculate the deviation between the vector V indicating the gaze direction of the person p and the vector for the object as the focusing point for each person p in step S204. The attention state estimating unit 40 determines whether the deviation in the horizontal direction calculated in step 204 is less than 30 degrees in step S205. Then, the attention state estimating unit 40 may determine that the person p watches the focusing point when the deviation is less than 30 degrees and may determine that the person p does not watch the focusing point when the deviation is equal to or greater than 30 degrees. When it is determined that the person does not watch the focusing point, the action planning unit 80 may select a candidate action depending on whether the focusing point is the robot 1, whether the focusing point is an object on which the attention level is increased via the robot 1, whether the focusing point is other than the robot 1, or whether an object on which the audience is desired to watch is not present.

Second Embodiment

The first embodiment describes an example in which the robot 1 estimates the gaze direction of the audience using the measurement information of the sensor 2, but this embodiment will describe an example in which the gaze direction of the audience is estimated also using image information captured by an imaging unit together with the measurement information of the sensor.

Figure 20:
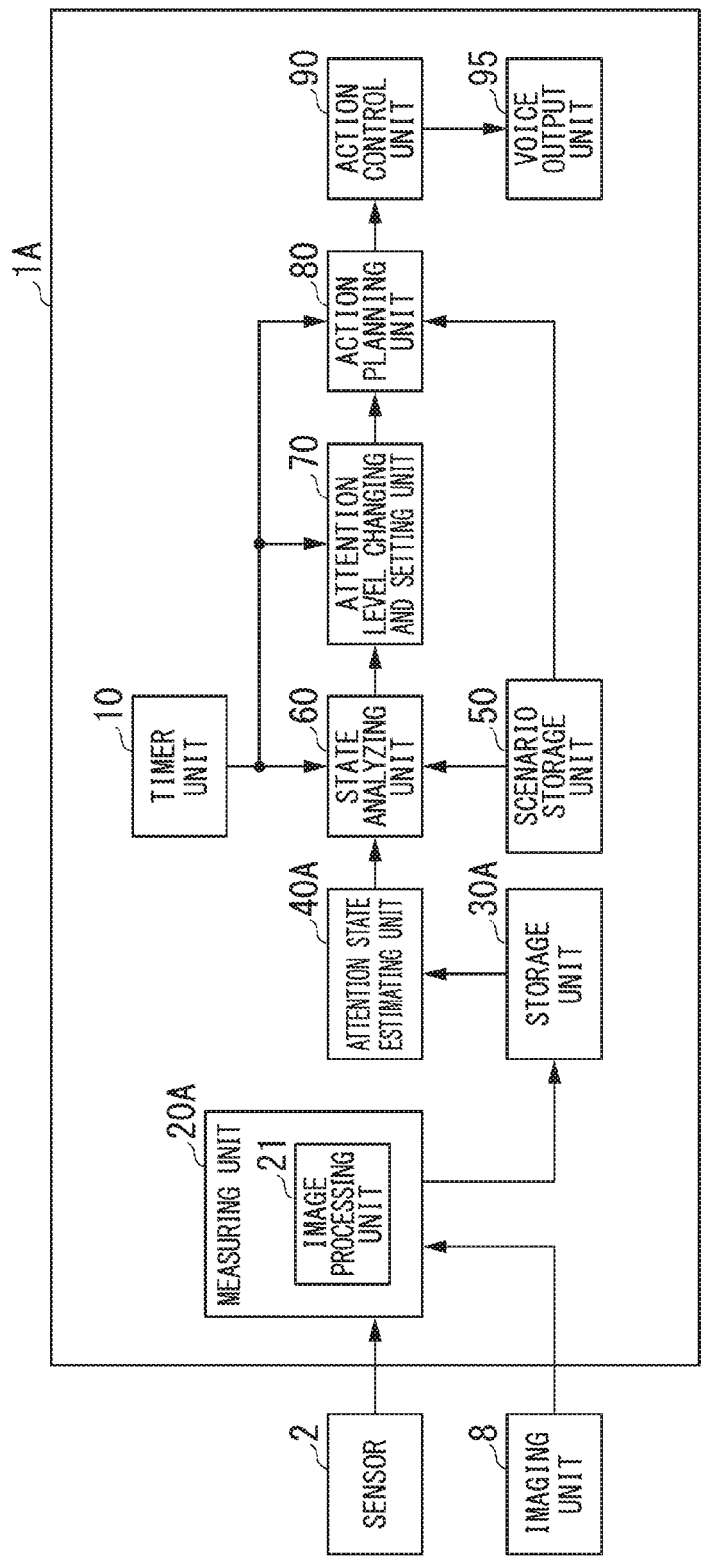
FIG. 20 is a block diagram schematically illustrating a robot according to a second embodiment.

FIG. 20 is a schematic block diagram of a robot 1A according to this embodiment. As illustrated in FIG. 20, the robot 1A includes a timer unit 10, a measuring unit 20A, a storage unit 30A, an attention state estimating unit 40A, a scenario storage unit 50, a state analyzing unit 60, an attention level changing and setting unit 70, an action planning unit 80, an action control unit 90, and a voice output unit 95. A sensor 2 and an imaging unit 8 are coupled to the robot 1A. The measuring unit 20A includes an image processing unit 21. The functional units having the same functions as the robot 1 according to the first embodiment will be referenced by the same reference numerals and signs, and the description thereof will not be repeated.

The imaging unit 8 captures an image every at predetermined interval and transmits the captured image signal to the robot 1A. The imaging unit 8 may transmit the captured image signal in a wireless manner or in a wired manner. When a plurality of imaging units 8 are present, the image signals have only to be synchronized with each other between channels at the time of transmission. The image may be a still image or may be a moving image. The imaging unit 8 is installed at a position at which persons can be overlooked, for example, on the ceiling or the wall of a space to be observed. The number of imaging units 8 may be one or more. When the number of imaging units 8 is two or more, the imaging units 8 are disposed to partially overlap the images captured by the imaging units.

The measuring unit 20A generates person cluster data using information input from the sensor 2 and the imaging unit 8. The measuring unit 20A projects distance-measurement points of which the value of the z-axis component is equal to or greater than a predetermined value among the information of the distance-measurement points input from the sensor 2 onto the x-y plane using the x-axis component and the y-axis component included in the information of each distance-measurement point. The measuring unit 20A classifies the projection points projected onto the x-y plane into clusters using a known method similarly to the first embodiment. The measuring unit 20A calculates the position of the center of gravity of the projection points included in the cluster for each classified cluster and sets the calculated position of the center of gravity as the person cluster data position of the cluster. The measuring unit 20A detects the person cluster data height for each cluster. The measuring unit 20A calculates the direction of a person p and the gaze direction of the person p for each cluster. The measuring unit 20A correlates the person cluster data position, the direction of the person p, and the gaze direction of the person p which are calculated for each cluster, the direction in the z-axis direction of the person which is detected for each person p by the image processing unit 21, and the person cluster date height with each other to generate person cluster data and stores the generated person cluster data in the storage unit 30A. The measuring unit 20A calculates the number of generated person cluster data pieces as the total number of persons N present in the area 6 (see FIG. 1) and stores the calculated total number of persons N present in the area 6 in the storage unit 30A. The measuring unit 20A assigns an identifier (ID) to each classified cluster and performs a tracking process on the cluster having an identifier assigned thereto at each predetermined sampling timing.

The image processing unit 21 extracts areas including faces of the audience present in the area 6 for each person using a known image recognition technique. The image processing unit 21 detects the direction in the z-axis direction of the face of each person using the extracted image of the area including faces. The image processing unit 21 extracts parts such as eye, nose, and mouth from the extracted image and detects the direction in the z-axis direction of each face using a known technique depending on a shapes, a slope, an arrangement, and the like of the extracted parts. When parts such as eye, nose, and mouth cannot be extracted, the image processing unit 21 may detect that the person has the back turned to the stage 3.

As described above, in this embodiment, the image processing unit 21 determines whether a person faces the stage 3 or the back thereof faces the stage 3 on the basis of the image information. The image processing unit 21 detects the sight line direction in the z-axis direction of the person on the basis of the image information.

The measuring unit 20A detects the position of the person, the direction on the x-y plane of the person, and the gaze direction of the person p on the basis of the information of the distance-measurement points acquired from the sensor 2.

The position information at which the screen 5 as an object is located, the position information at which the object on exhibition 4 is located, and the position information of the robot 1A are stored in the storage unit 30A. As illustrated in FIG. 21, an identifier, information indicating a position on the x-y plane, information indicating the direction of the person p, gaze direction information (sight line direction on the x-y plane) indicating the gaze direction of the person p, the sight line direction in the z-axis direction, and height information are correlated and stored in the storage unit 30A for each person p in the area 6. The total number N of persons p who are present in the area 6 is also stored in the storage unit 30A. FIG. 21 is a diagram illustrating an example of information which is stored in the storage unit 30A according to this embodiment. As illustrated in FIG. 21, for example, the person cluster data having an identifier of 2 is correlated with the position information (x42, y42) on the x-y plane, the person direction information A1-2, the sight line direction Z1-2 in the z-axis direction of the person, the gaze direction information V-2, and the height information z42.

The attention state estimating unit 40A reads the position information of the objects, the person cluster data, and the total number of persons p N present in the area 6 which are stored in the storage unit 30A. The attention state estimating unit 40A estimates the attention state of each person p using the read information and outputs the estimation result of each person p to the state analyzing unit 60. Similarly to the first embodiment, the estimation result includes at least one information set and audience ratio among information indicating that the robot 1A is watched and the ratio of the audience watching the robot 1A, information indicating that the object on exhibition 4 is watched and the ratio of the audience watching the object on exhibition 4, information indicating that the screen 5 is watched and the ratio of the audience watching the screen 5, information indicating that a watched object is not present and the ratio of the audience watching no object, and information indicating that others are watched and the ratio of the audience watching others.

Effective Viewing Angle and Gaze Direction of Person p

Figure 22:
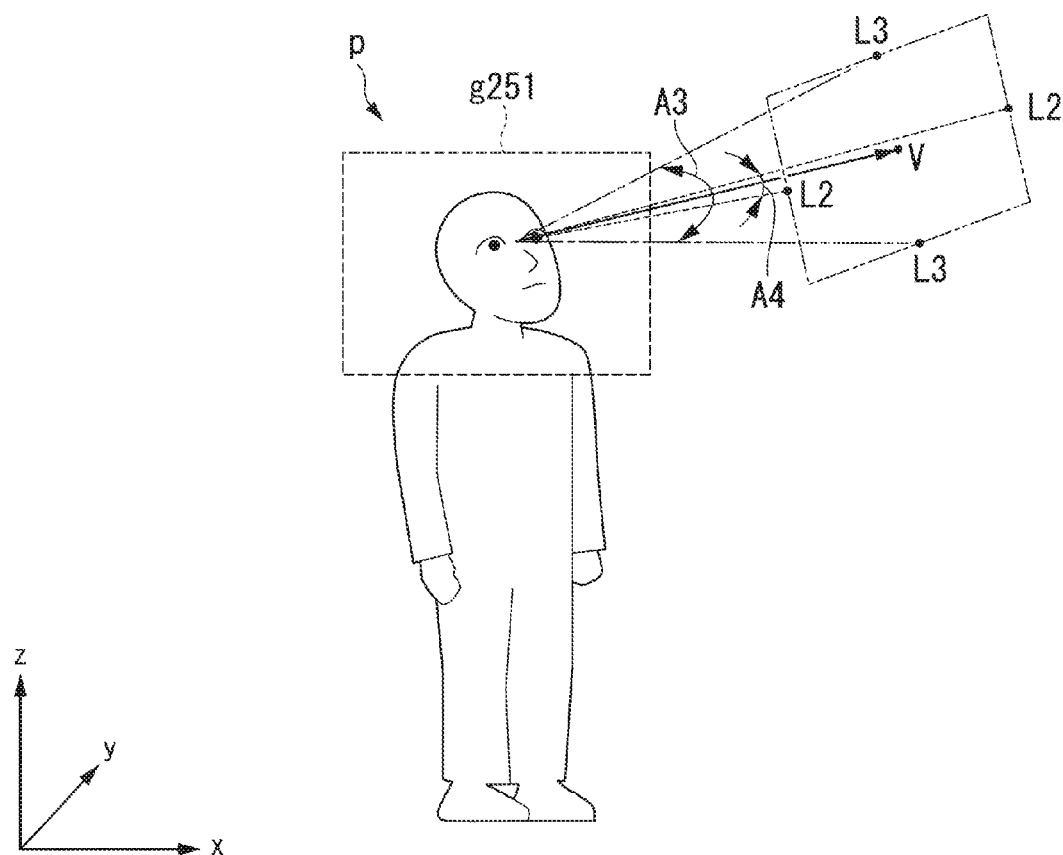
FIG. 22 is a diagram illustrating examples of an image captured by an imaging unit, an effective viewing angle, and a gaze direction of a person according to the second embodiment.

FIG. 22 is a diagram illustrating examples of an image captured by the imaging unit 8, an effective viewing angle, and a gaze direction of a person p according to this embodiment. The coordinate system in FIG. 22 is the same as in FIG. 1.

In the example illustrated in FIG. 22, a person p obliquely watches an object which is located in a right-front side. In FIG. 22, an area denoted by reference sign g251 is an image of an area including a face of the person p which is imaged by the imaging unit 8. A chained line denoted by reference sign L2 indicates a range of an effective viewing angle in the horizontal direction (x-y plane), and a dotted line denoted by reference sign L3 indicates a range of an effective viewing angle in the vertical direction (z-axis direction). The angle A3 indicates a viewing angle in the horizontal direction, and the angle A4 indicates a viewing angle in the z-axis direction.

Clustering Process and Person Cluster Data Generating Process

Figure 23:
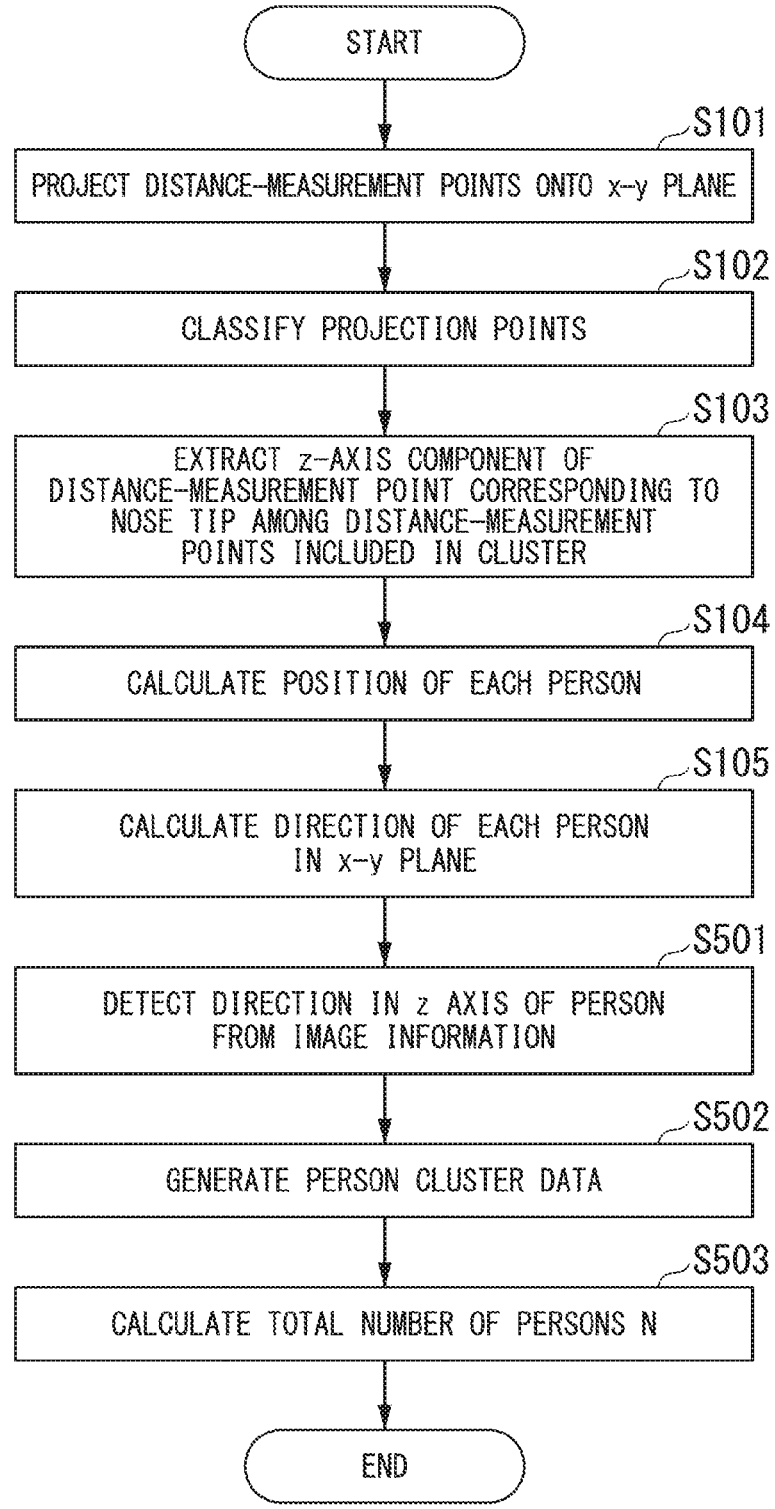
FIG. 23 is a flowchart illustrating a flow of a clustering process and a person cluster data generating process according to the second embodiment.

A flow of a clustering process and a person cluster data generating process will be described below with reference to FIG. 23. FIG. 23 is a flowchart illustrating a flow of the clustering process and the person cluster data generating process according to this embodiment. The same processes as illustrated in FIG. 11 according to the first embodiment are referenced by the same reference numerals, and the description thereof is not repeated.

(Steps S101 to S105) The measuring unit 20A performs the processes of steps S101 to S105 in the same ways as steps S101 to S105 in FIG. 11. The measuring unit 20A moves the process flow to step S501.

(Step S501) The image processing unit 21 extracts an area including a face of the audience who is present in the area 6 (see FIG. 1) for each person using a known image recognition technique. Then, the image processing unit 21 detects the direction in the z-axis direction of the face of each person p using the image of the extracted area including a face. The image processing unit 21 moves the process flow to step S502.

(Step S502) The measuring unit 20A correlates the person cluster data position, the direction of the person p, and the gaze direction of the person p which is calculated for each cluster, the direction in the z-axis direction of the person which is detected for each person p by the image processing unit 21, and the person cluster data height to generate person cluster data and stores the generated person cluster data in the storage unit 30A. The measuring unit 20A moves the process flow to step S508.

(Step S503) The measuring unit 20A performs the process of step S503 in the same way as step S107 in FIG. 11.

Then, the clustering process and the person cluster data generating process end.

An estimation process which is performed by the attention state estimating unit 40A will be described below with reference to FIG. 14.

(Step S201) The attention state estimating unit 40A reads from the storage unit 30A the information indicating the person cluster data position, the information indicating the direction in the x-y plane, and the information indicating the direction in the z-axis direction for each person p. Then, the attention state estimating unit 40A reads the position information of each object. Then, the attention state estimating unit 40A extracts the coordinate of the center of gravity in the x-y plane for object. The attention state estimating unit 40A moves the process flow to step S202.

(Steps S202 and S203) The attention state estimating unit 40A performs the processes of steps S202 and S203.

(Step S204) The attention state estimating unit 40A estimates the vector V indicating the gaze direction of the person p for each person p using the information indicating the direction in the x-y plane and the information indicating the direction in the z-axis direction with the read position information as a start point. The attention state estimating unit 40A moves the process flow to step S205.

(Steps S205 to S214) The attention state estimating unit 40A performs the processes of steps S205 to S214.

Then, the estimation process which is performed by the attention state estimating unit 40A ends.

The process which is performed by the state analyzing unit 60 is the same as illustrated in FIG. 15 according to the first embodiment. The processes which are performed by the attention level changing and setting unit 70 and the action planning unit 80 are the same as illustrated in FIG. 18 according to the first embodiment.

In this embodiment, the state analyzing unit 60 may estimate an object watched by the audience using the number of persons Nobj_see watching the object on exhibition 4 and an Nobj ratio which is a ratio of the persons watching the object on exhibition 4, the number of persons Nsr_see watching the screen 5 and an Nsr ratio which is a ratio of the persons watching the screen 5, and the number of persons Non_see not watching the objects and an Nnon ratio which is a ratio of the persons not watching the objects.

As described above, the autonomous moving device (for example, the robot 1A) according to this embodiment further includes an imaging unit (for example, the imaging unit 8) configured to capture an image of the predetermined area (for example, the area 6), and the measuring unit (for example, the sensor 2 or the measuring unit 20A) measures information indicating the gaze directions of the persons who are present in the predetermined area on the basis of the image captured by the imaging unit.

According to the configuration of this embodiment, since the sight line direction of each person p is detected using the image captured by the imaging unit 8, it is possible to accurately estimate the gaze direction in the z-axis direction of each person.

In this embodiment, when the focusing point does not match the object watched by the audience, the robot 1A can change the attention of the audience from the object by performing an action to redirect the attention from the object watched by the audience. As a result, according to this embodiment, it is possible to change an object watched by the audience.

In this embodiment, the image processing unit 21 detects the angle in the z-axis direction of the face of each person p using the image of the extracted area including the face, but the present invention is not limited to this example. The image processing unit 21 may detect the direction in the x-y plane (FIG. 1) of the face of each person p using the image of the extracted area including the face.

In this embodiment, the measuring unit 20A detects the sight line direction of each person p using the image captured by the imaging unit 8, but the present invention is not limited to this example. The measuring unit 20A may detect the total number of persons N present in a predetermined area by applying a known technique to the captured image.

Third Embodiment

In the first embodiment and the second embodiment, the area 6 is considered as a single area, but the area 6 is divided into two or more areas, and the divided areas are processed in this embodiment.

Figure 24:
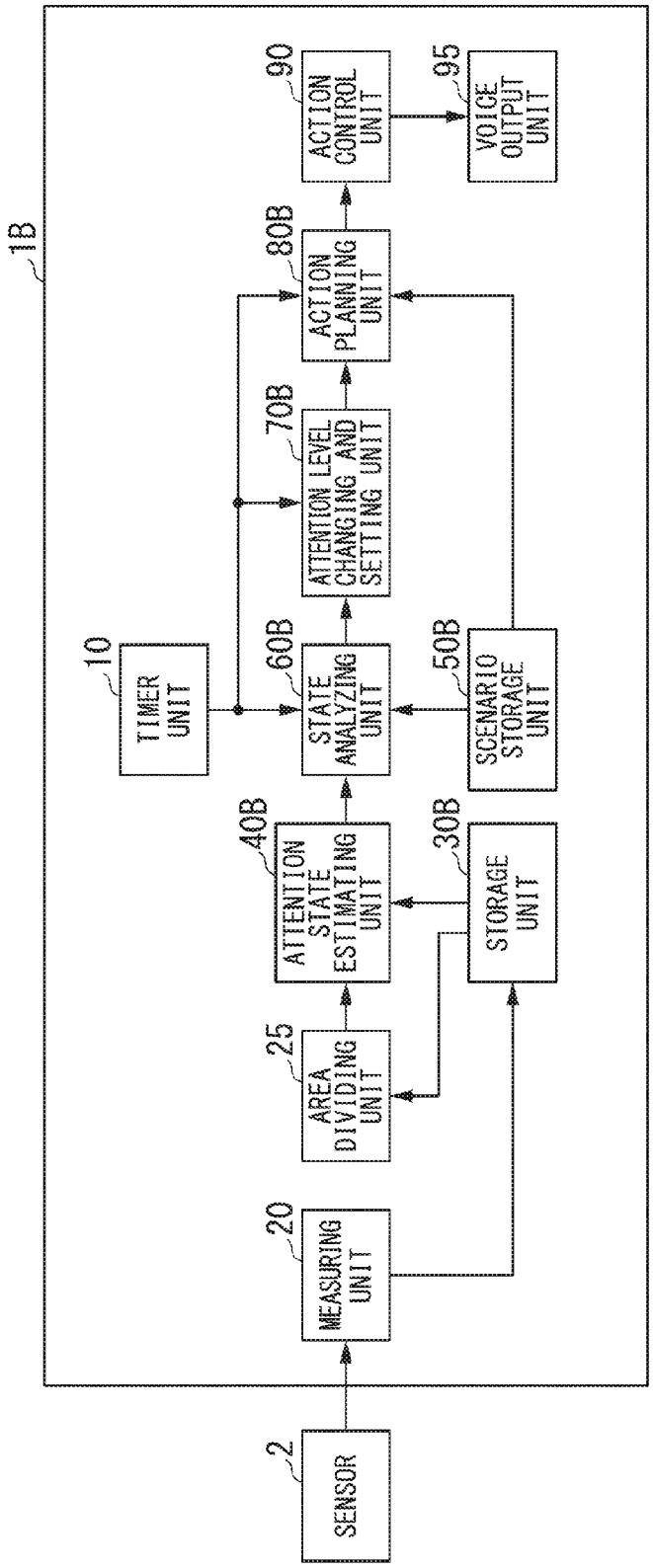
FIG. 24 is a block diagram schematically illustrating a robot according to a third embodiment.

FIG. 24 is a schematic block diagram of a robot 1B according to this embodiment.

As illustrated in FIG. 24, the robot 1B includes a timer unit 10, a measuring unit 20, an area dividing unit 25, a storage unit 30B, an attention state estimating unit 40B, a scenario storage unit 50B, a state analyzing unit 60B, an attention level changing and setting unit 70B, an action planning unit 80B, an action control unit 90, and a voice output unit 95. A sensor 2 is coupled to the robot 1B. The functional units having the same functions as the robot 1 described with reference to FIG. 2 according to the first embodiment will be referenced by the same reference numerals and signs, and description thereof will not be repeated.

The area dividing unit 25 reads division information and the total number of persons p N who are present in the area 6 from the storage unit 30B. The division information includes the number of areas into which the area 6 is divided and information indicating the position or range of each area. The area dividing unit 25 reads an identifier of each person p present in the area 6 and a position in the x-y plane of each person p from the storage unit 30B.

The area dividing unit 25 divides the area 6 (FIG. 1) on the basis of the read division information. Here, the areas obtained by division are also referred to as divided areas. The area dividing unit 25 detects the persons p who are present in each divided area on the basis of the position in the x-y plane for each person p. The area dividing unit 25 outputs area information in which information indicating the divided area and the identifier of the person p are correlated to the attention state estimating unit 40B.

The information on position at which the screen 5 is located, the information on position at which the object on exhibition 4 is located, the position information of the robot 1B, and the division information of the area 6 are stored in the storage unit 30B. An identifier, the person cluster data position in the x-y plane, information indicating the direction of the person p, gaze direction information indicating the gaze direction of the person p, and the person cluster data height are correlated and stored as person cluster data in the storage unit 30B for each person present in the area 6. The total number of persons p N who are present in the area 6 is also stored in the storage unit 30B.

The attention state estimating unit 40B reads the position information of the objects and the person cluster data which are stored in the storage unit 30B. The area information in which the information indicating the area and the identifier of the person p are correlated is input to the attention state estimating unit 40B from the area dividing unit 25. The attention state estimating unit 40B estimates the object watched by each person p using the read information and the input information similarly to the first embodiment. The attention state estimating unit 40B estimates the object most watched by the persons present in each divided area and outputs the estimation result for each divided area to the state analyzing unit 60B. The estimation result includes at least one information set and audience ratio among information indicating that the robot 1B is most watched and the ratio of the audience most watching the robot 1B, information indicating that the object on exhibition 4 is most watched and the ratio of the audience mostly watching the object on exhibition 4, information indicating that the screen 5 is most watched and the ratio of the audience mostly watching the screen 5, information indicating that a watched object is not present and the ratio of the audience watching no object, and information indicating that a focusing point other than the robot 1B is watched and the ratio of the audience watching the focusing point other than the robot 1B.

As illustrated in FIG. 25, the scenario storage unit 50B stores times, information indicating a focusing point at each time, information indicating an explanatory note at each time, and information indicating a scheduled moving position of the robot 1B, correlated among themselves. In the example illustrated in FIG. 25, the area 6 is divided into a first area and a second area, and a focusing point of each divided area is stored.

FIG. 25 is a diagram illustrating an example of information stored in the scenario storage unit 50B according to this embodiment. In the example illustrated in FIG. 25, at times t0 and t1, the focusing point in the first area is the screen 5 (FIG. 1) and the focusing point in the second area is the robot 1B. At times t2 and t5, the focusing points in the first area and the second area are the robot 1B. At time t3, the focusing point in the first area is the object on exhibition 4

(FIG. 1), and the focusing point in the second area does not correspond to any object which the audience is desired to watch. At time t4, the focusing point in the first area does not correspond to any object which the audience is desired to watch, and the focusing point in the second area is the object on exhibition 4. At time t6, the focusing point in the first area is the object on exhibition 4 and the focusing point in the second area is the robot 1B.

The scenario storage unit 50B stores information on actions for increasing the attention level to the robot 1B and information on actions for decreasing the attention level to the robot 1B as illustrated in FIG. 8 similarly to the first embodiment.

The robot 1B will continue to be described with reference to FIG. 24.

The state analyzing unit 60B reads information indicating the focusing points in the areas at the corresponding time, which is stored in the scenario storage unit 50B, on the basis of the time information input from the timer unit 10. The state analyzing unit 60B determines whether the object watched by the audience in each divided area matches the focusing point stored in the scenario storage unit 50B at each time using the read information and the estimation information for each divided area input from the attention state estimating unit 40B. The state analyzing unit 60B outputs the determination result (determination result 1 or determination result 2) at each time for each divided area to the attention level changing and setting unit 70B.

The time information from the timer unit 10 and the determination result at each time for each divided area from the state analyzing unit 60B are input to the attention level changing and setting unit 70B. When information indicating that the object watched by the audience in each divided area matches the focusing point thereof is input, the attention level changing and setting unit 70B performs a setting (hereinafter, referred to as non-changing setting) to leave the attention level in the corresponding area intact. On the other hand, when information indicating that the object watched by the audience in each divided area does not match the focusing point thereof is input from the state analyzing unit 60B, the attention level changing and setting unit 70B determines whether to increase the attention level to the robot 1B or to decrease the attention level to the robot 1B. The attention level changing and setting unit 70B outputs any one of the non-changing setting, the setting for increasing the attention level to the robot 1B, and the setting for decreasing the attention level to the robot 1B to the action planning unit 80B at each time for each divided area.

When the non-changing setting is input from the attention level changing and setting unit 70B, the action planning unit 80B selects a corrective course of action for continuously performing the scenario (generation of an explanatory note, action, and the like) for that time which is stored in the scenario storage unit 50B. In this case, the action planning unit 80B reads the information indicating the explanatory note corresponding to the time information input from the timer unit 10 and the information indicating the scheduled moving position of the robot 1B and outputs the read information as a candidate action to the action control unit 90.

On the other hand, when any one set of the information indicating that the robot 1B is a waypoint, the information indicating that the robot 1B is an object on which the audience is desired to focus, the information indicating that an object on which the audience is desired to focus is other than the robot 1B, and the information indicating that an object on which the audience is desired to focus is not present is input from the attention level changing and setting unit 70B, the action planning unit 80B selects the corresponding candidate action from the scenario storage unit 50B. The action planning unit 80B determines the selected candidate action as the action plan of the corresponding area. The action planning unit 80B outputs information indicating candidate actions for each selected divided area to the action control unit 90.

The action planning unit 80B outputs information indicating candidate actions for each selected divided area to the action control unit 90. The action planning unit 80B calculates the position of the robot 1B and outputs the calculated position of the robot 1B to the measuring unit 20.

Division of Area

An example in which the area 6 is divided will be described below.

Figure 26:
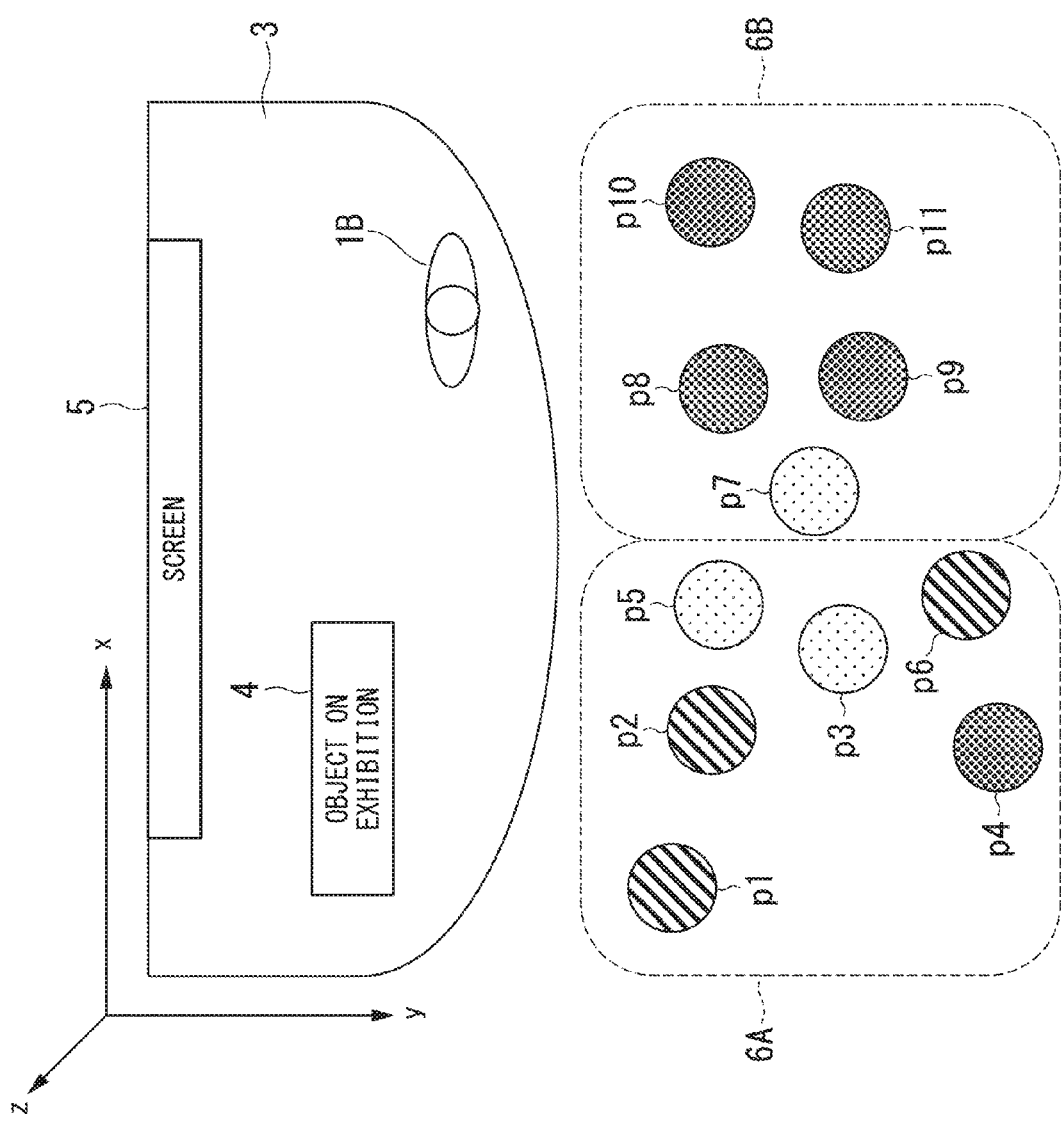
FIG. 26 is a diagram illustrating an example in which an area is divided into two areas consisting of a first area and a second area according to the third embodiment.

FIG. 26 is a diagram illustrating an example in which the area 6 is divided into two areas of the first area and the second area according to this embodiment. The coordinate system in FIG. 26 is the same as FIG. 17. Similarly to FIG. 17, the stage 3 is present in a hall, and the object on exhibition 4 is exhibited, for example, on an exhibition stand at the front-left side on the stage 3. The screen 5 is installed at the rear side of the stage 3. The robot 1B provides an explanation to the audience while autonomously moving on the stage 3 depending on situations.

In FIG. 26, an area indicated by reference sign 6A denotes a first area and an area indicated by reference sign 6B denotes a second area. In the example illustrated in FIG. 26, six persons p1 to p6 as the audience are present in the first area denoted by reference sign 6A, and five persons p7 to p11 as the audience are present in the second area denoted by reference sign 6B In the example illustrated in FIG. 26, the person p1, the person p2, and the person p6 present in the first area watch the screen 5. The person p4 watches the object on exhibition 4, and the person p3 and the person p5 watch the robot 1B.

In the example illustrated in FIG. 26, four persons p8 to p11 as the audience present in the second area watch the object on exhibition 4. The person p7 watches the robot 1B.

Calculation of Watching Ratio

The flow of the clustering process and the person cluster data generating process which are performed by the measuring unit 20 is the same as illustrated in FIG. 11 according to the first embodiment.

Figure 27:
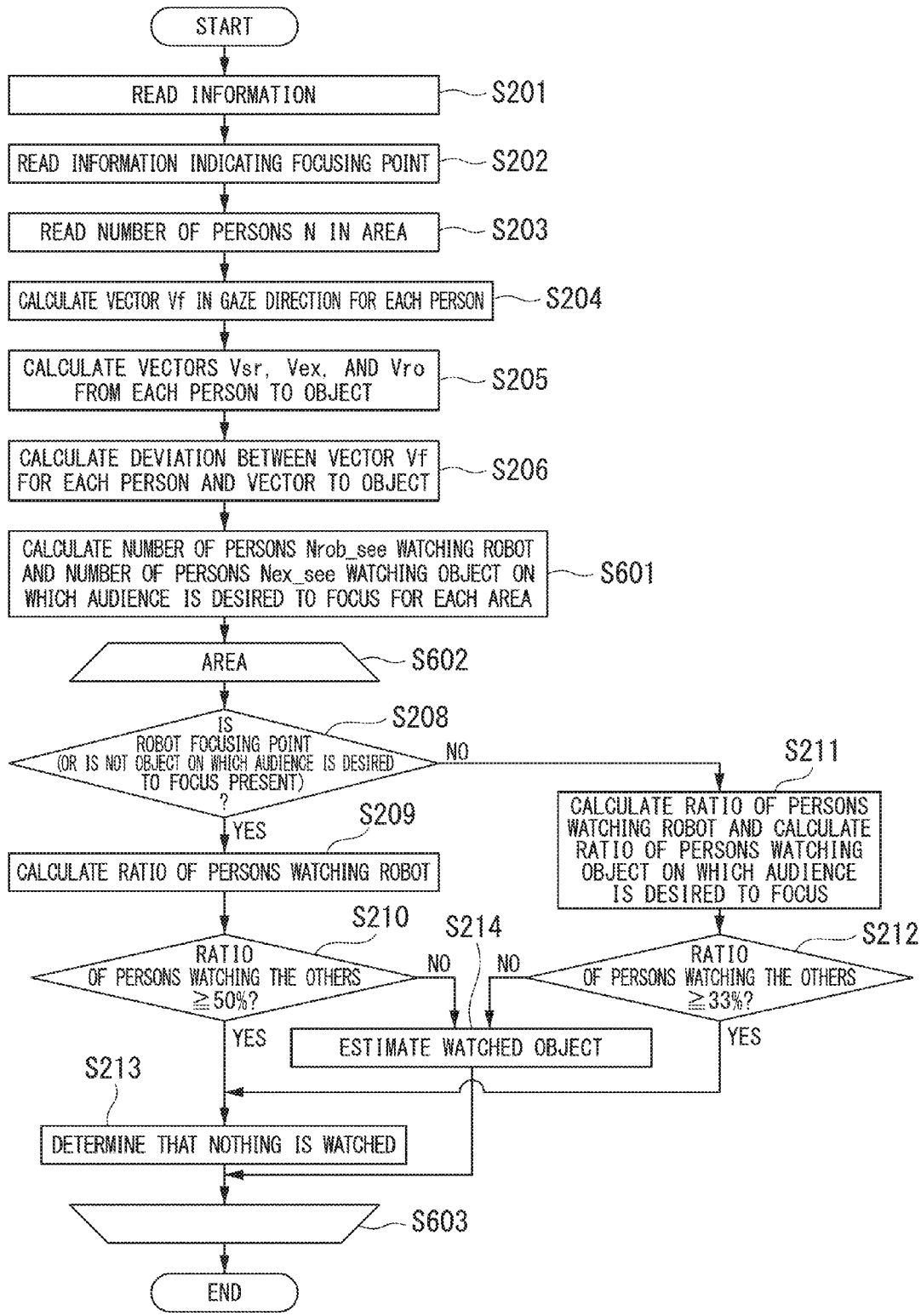
FIG. 27 is a flowchart illustrating a process flow which is performed by an attention state estimating unit according to the third embodiment.

A process flow which is performed by the attention state estimating unit 40B will be described below. FIG. 27 is a flowchart illustrating a process flow which is performed by the attention state estimating unit 40B according to this embodiment. The same steps as illustrated in FIG. 13 will be referenced by the same reference signs, and description thereof will not be repeated.

(Steps S201 to S206) The attention state estimating unit 40B performs the processes of steps S201 to S206 in the same way as steps S201 to S206 in FIG. 13. The attention state estimating unit 40B moves the process flow to step S601.

(Step S601) The attention state estimating unit 40B extracts an angle deviation in the horizontal direction between the vector V indicating the gaze direction of the person p and the vectors (Vsr, Vex, and Vro) from the person p to the objects that is less than 30 degrees and calculated in step S604 for each person p. Specifically, the attention state estimating unit 40B estimates that the object having the smallest angle deviation among the objects estimated to be watched is an object most watched by the person p. When a plurality of objects having the same deviation are present within a predetermined range, the attention state estimating unit 40B estimates that the object closer to the person p is a most watched object. The attention state estimating unit 40B moves the process flow to step S602.

(Step S602) The attention state estimating unit 40B selects one of the divided areas. Subsequently, the attention state estimating unit 40B performs the processes of steps S208 to S213 on the selected divided areas.

(Step S603) The attention state estimating unit 40B ends the process flow after completing the process on all the divided areas.

The attention state estimating unit 40B may perform the processes of steps S201 to S603 at every predetermined time, for example, at every 100 [msec].

In this embodiment, under the assumption that each person p looks in the horizontal direction, the attention state estimating unit 40B may estimate that an object within 20 degrees of the effective viewing angle in the vertical direction in addition to the effective viewing angle in the horizontal direction is an object looked by the person p.

When the robot 1B includes the imaging unit 8 and the image processing unit 21, the attention state estimating unit 40B may estimate the sight line direction in the z-axis direction of each person p or estimate the direction of a person on the x-y plane and the sight line direction in the z-axis direction on the basis of the captured image.

Analysis of State

A process flow which is performed by the state analyzing unit 60B will be described below.

Figure 28:
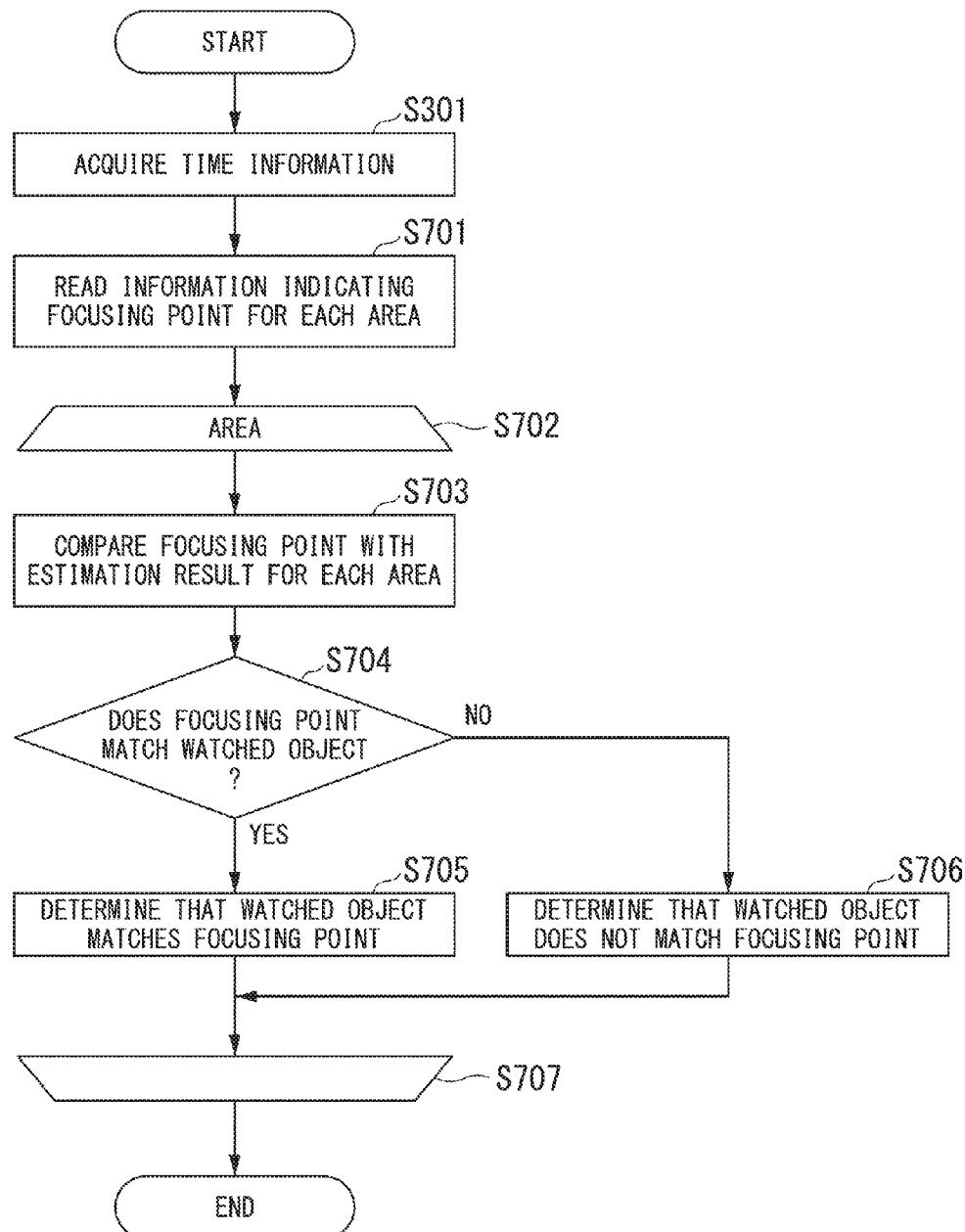
FIG. 28 is a flowchart illustrating a process flow which is performed by a state analyzing unit according to the third embodiment.

FIG. 28 is a flowchart illustrating a process flow which is performed by the state analyzing unit 60B according to this embodiment. The same steps as illustrated in FIG. 15 will be referenced by the same reference signs, and the description thereof will not be repeated.

(Step S301) The state analyzing unit 60B performs the process of step S301 in the same way as step S301 in FIG. 15. The state analyzing unit 60B moves the process flow to step S701.

(Step S701) The state analyzing unit 60B reads from the scenario storage unit 50B the focusing point for each divided area correlated with the time based on the acquired time information. The state analyzing unit 60B moves the process flow to step S702.

(Step S702) The state analyzing unit 60B selects one of the divided areas. Subsequently, the state analyzing unit 60B performs the processes of steps S703 to S706 on each selected divided area.

(Step S703) The state analyzing unit 60B compares the estimation result for each divided area input from the attention state estimating unit 40B with the information indicating the focusing point in each divided area read from the scenario storage unit 50B. The state analyzing unit 60B moves the process flow to step S704.

(Step S704) The state analyzing unit 60B determines whether the most watched object included in the estimation result matches the focusing point for each divided area. The state analyzing unit 60B moves the process flow to step S705 when it is determined that the most watched object matches the focusing point (YES in step S704) and moves the process flow to step S706 when it is determined that the most watched object does not match the focusing point (NO in step S704).

(Step S705) the state analyzing unit 60B determines that the watched object in the selected divided area matches the focusing point. Then, the state analyzing unit 60B outputs the determination result to the attention level changing and setting unit 70B. The determination result includes information indicating the determined divided area.

(Step S706) The state analyzing unit 60B determines that the most watched object in the selected divided area does not match the focusing point. Then, the state analyzing unit 60B outputs the determination result to the attention level changing and setting unit 70B.

(Step S707) The state analyzing unit 60B ends the process flow after completing the process on all the divided areas.

The state analyzing unit 60B may perform the processes of steps S301 to S707 at every predetermined time, for example, at every 100 [msec].

In this embodiment, the state analyzing unit 60B may estimate an object watched by the audience using the number of persons Nobj_see watching the object on exhibition 4 and the Nobj ratio which is a ratio of the persons watching the object on exhibition 4, the number of persons Nsr_see watching the screen 5 and the Nsr ratio which is a ratio of the persons watching the screen 5, and the number of persons Non_see not watching the objects and the Nnon ratio which is a ratio of the persons not watching the objects.

Changing and Setting of Attention Level and Action Plan

An example of a process flow which is performed by the attention level changing and setting unit 70B, the action planning unit 80B, and the action control unit 90 will be described below.

FIG. 29 is a diagram illustrating examples of an object watched by persons present in the first area (see FIG. 26) and an object watched by persons present in the second area (see FIG. 26) at times t0 to t6. The focusing points in the first area and the second area at times t0 to t6 are the same as illustrated in FIG. 25.

As illustrated in FIGS. 25 and 29, at times t0, t2, t5, and t6, the focusing points in the first area and the second area match the objects most watched by the persons in the areas.

On the other hand, at time t1, the focusing point (the screen 5) in the first area matches the object (the screen 5) most watched by the person present in the area, and the focusing point (the robot 1B) in the second area does not match the object (the screen 5) most watched by the persons present in the area. At time t3, the focusing point (the object on exhibition 4) in the first area matches the object (the object on exhibition 4) most watched by the person present in the area, and the focusing point (an object on which the audience is desired to focus is not present) in the second area does not match the object (the robot 1B) most watched by the persons present in the area. At time t4, the focusing point (an object on which the audience is desired to focus is not present) in the first area does not match the object (the object on exhibition 4) most watched by the person present in the area, and the focusing point (the object on exhibition 4) in the second area matches the object (the object on exhibition 4) most watched by the persons present in the area.

The attention level changing and setting unit 70B, the action planning unit 80B, and the action control unit 90 perform the processes of steps S401 to S413 in FIG. 18 on each divided area.

Through this process flow, the attention level changing and setting unit 70B and the action planning unit 80B determine whether to change or maintain the actions in the divided areas.

For example, when the focusing point (the robot 1B) in the second area does not match the object (the screen 5) most watched by the persons present in the divided area as at time t1 in FIG. 25, the attention level changing and setting unit 70B selects a candidate action to perform the selected action on the audience present in the divided area in which it is desired to change the attention on the watched object. In this case, since it is desired to increase the attention level to the robot 1B, the action planning unit 80B selects a candidate action of waving a hand at the audience present in the second area or a candidate action of watching the audience present in the second area.

In the example illustrated in FIG. 29, the object most watched by the persons present in only one area of the divided areas is different from the focusing point in the area, but the present invention is not limited to this example. For example, as illustrated in FIGS. 25, 26, and 29, the number of divided areas is two, and the object most watched by the persons present in each divided area may be different from the focusing point set in each area. In this case, the action planning unit 80B selects a candidate action to perform the selected action on the audience present in the divided area in which it is desired to change the attention on the watched object for each divided area. For example, the action planning unit 80B may preferentially select an action not accompanied with a leg movement of the robot 1B and may sequentially change the attention on the object most watched by the persons in the first area or the second area. For example, when the robot 1B is at a nearby position in the first area, the action planning unit 80B may preferentially cause the robot 1B to act to change the attention on the object most watched by the persons present in the first area. Thereafter, the action planning unit 80B may cause the robot 1B to act to change the attention on the object watched by the persons present in the second area. The changing of the attention on the watched object refers to, for example, redirecting the attention to the screen 5 set as the focusing point when the audience most watches the object on exhibition 4.

A specific example of the process flow which is performed by the robot 1B according to this embodiment will be described below with reference to FIG. 26. It is assumed that identifiers ID1 to ID11 are assigned to the persons p1 to p11, respectively.

As illustrated in FIG. 26, the area dividing unit 25 divides the area 6 into two divided areas of a first area indicated by reference sign 6A and a second area indicated by reference sign 6B. Then, the area dividing unit 25 correlates the identifiers ID1 to ID6 present in the first area, the number of persons (six) present in the first area, and information indicating the first area to generate first area information. The area dividing unit 25 correlates the identifiers ID7 to ID11 present in the second area, the number of persons (five) present in the second area, and information indicating the second area to generate second area information. The area dividing unit 25 outputs the generated first area information and the generated second area information to the attention state estimating unit 40B.

The attention state estimating unit 40B estimates the vector V (FIG. 12) indicating the gaze direction of each person p for the persons p corresponding to the identifiers ID1 to ID6 present in the first area. The attention state estimating unit 40B calculates the vector Vsr, the vector Vex, and the vector Vro for each person p in the first area using information indicating the positions and the directions of the persons p corresponding to the identifiers ID1 to ID6 and the position information of the objects. Then, the attention state estimating unit 40B calculates the angle deviations between the vector V indicating the gaze direction of the person p and the vectors (Vsr, Vex, and Vro) to the objects for each person p in the first area. Then, the attention state estimating unit 40B extracts the object for which the angle deviation in the horizontal direction is less than 30 degrees and the angle deviation in the vertical direction is less than 20 degrees and estimates the extracted object to be an object most watched by the person p. Then, the attention state estimating unit 40B calculates the ratio of the persons p mostly watching each object in the first area. Then, the attention state estimating unit 40B estimates that the object having the largest ratio in the first area is the object most watched by the persons present in the first area. In the example illustrated in FIG. 26, the number of persons present in the first area is six, the number of persons Nse_see most watching the screen 5 is three, the number of persons Nobj_see most watching the object on exhibition 4 is one, and the number of persons Nrob_see most watching the robot 1B is two. Accordingly, the attention state estimating unit 40B estimates that the object most watched by the persons present in the first area is the screen 5.

The attention state estimating unit 40B performs the same process as in the first area on the persons p corresponding to the identifiers ID7 to ID11 present in the second area and estimates the object most watched by the persons present in the second area. In the example illustrated in FIG. 26, the number of persons present in the second area is five, the number of persons Nse_see mostly watching the screen 5 is zero, the number of persons Nobj_see mostly watching the object on exhibition 4 is four, and the number of persons Nrob_see mostly watching the robot 1B is one. Accordingly, the attention state estimating unit 40B estimates the object most watched by the persons present in the second area is the object on exhibition 4.

The state analyzing unit 60B reads the focusing point in the first area and the focusing point in the second area which are stored in the scenario storage unit 50B. Then, the state analyzing unit 60B determines whether the focusing point in the first area matches the object estimated to be most watched by the audience by the attention state estimating unit 40B. The state analyzing unit 60B determines whether the focusing point in the second area matches the object estimated to be most watched by the audience by the attention state estimating unit 40B. For example, it is assumed that the focusing point set in the first area is the screen 5 and the focusing point set in the second area is the robot 1B. In this example, the object most watched by the persons present in the first area matches the focusing point, and the object most watched by the persons present in the second area does not match the focusing point.

The attention level changing and setting unit 70B selects a candidate action for changing the attention level to the object most watched by the audience in the second area in which the object estimated to be most watched by the audience does not match the focusing point. In this case, since the object which the audience is desired to watch is the robot 1B, the action planning unit 80B selects one of the candidate actions when the robot 1B is an object which the audience is desired to watch among the actions for increasing the attention level to the robot 1B in the example illustrated in FIG. 8.

The action control unit 90 controls the action of the robot 1B to change the action from the action stored in the scenario storage unit 50B on the basis of the selected candidate action.

Figure 30:
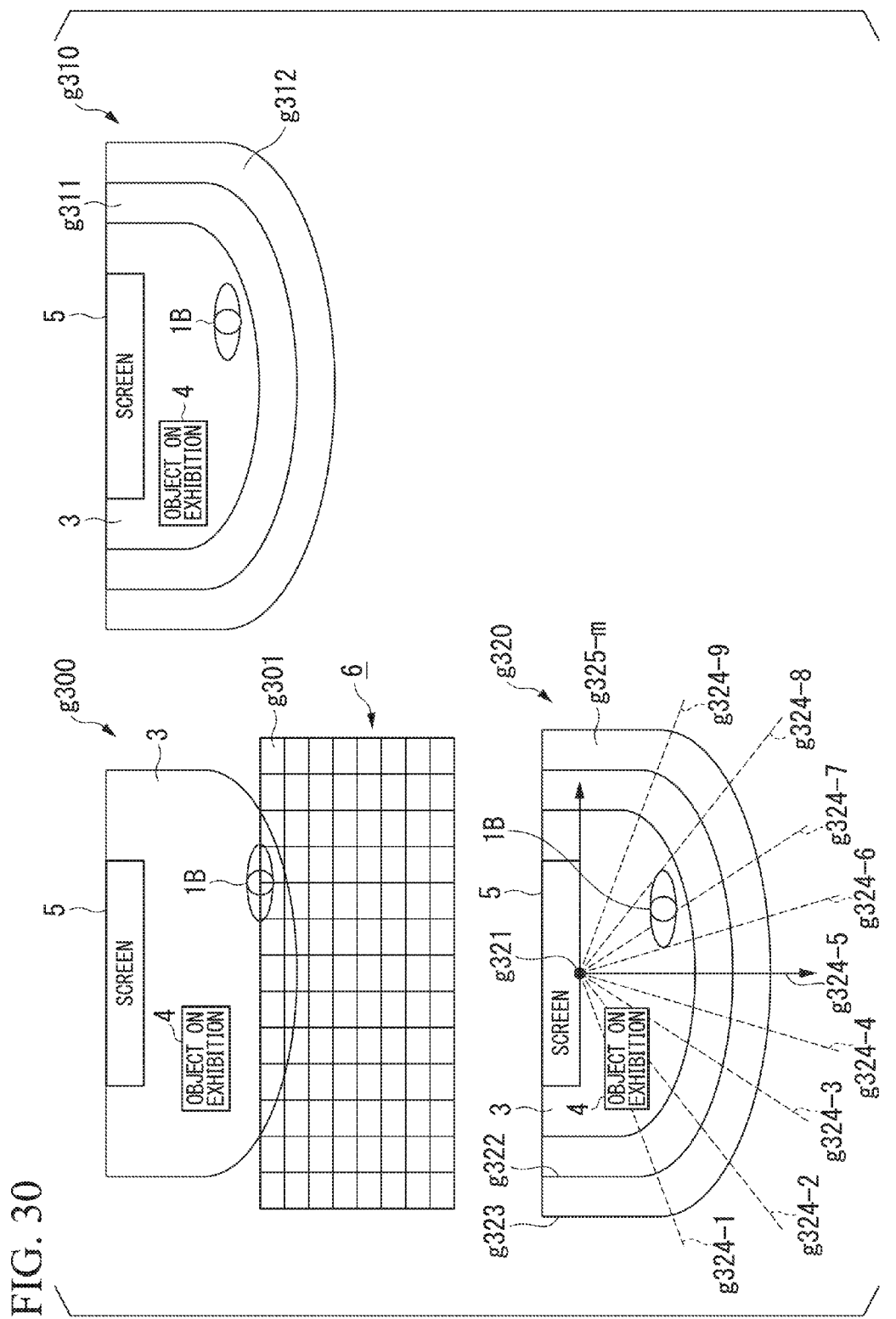
FIG. 30 is a diagram illustrating another example in which an area is divided according to the third embodiment.

FIG. 30 is a diagram illustrating another example in which an area is divided according to this embodiment.

In FIG. 30, the drawing denoted by reference sign g300 illustrates an example in which the area 6 is divided into divided areas of a grid having a predetermined size (area) as indicated by reference sign g301. The size of the grid indicated by reference sign g301 is a value determined in advance depending on the area of the hall. Alternatively, the size of the grid may be set depending on the density of persons present in the area 6. The density may be calculated from the person cluster data by the area dividing unit 25. As described in the second embodiment, when the robot 1B includes the imaging unit 8, the area dividing unit 25 may calculate the density on the basis of the captured image and may set the size of the grid on the basis of the calculation result. In the example illustrated in FIG. 26, two grids (divided areas) are present. The grids may have different sizes. The area dividing unit 25 may set the size of the grid in the area having a high density to be small and may set the size of the grid in the area having a low density to be larger than that of the grid in the area having a high density. The shape of the grid is not limited to a rectangle, but may be a ring, an ellipse, a polygon, or the like. The boundary of the grid may be set not to divide a cluster of one person p as illustrated in FIG. 26.

In FIG. 30, the drawing indicated by reference sign g310 illustrates an example of areas which are obtained by enlarging the shape of the stage 3. In the drawing of the area indicated by reference sign g310, reference signs g311 and g312 denote examples of the divided areas which are set by enlarging the shape of the stage 3.

In FIG. 30, the drawing indicated by reference sign g320 illustrates an example of a grid g325-$m$ (where m is an integer equal to or greater than 1) which is partitioned by lines g322 and g333 obtained by enlarging the shape of the stage 3 and lines g324-1 to g324-9 with equal angles therebetween passing through the center of the screen 5 where the center of the screen 5 at the rearmost position on the stage 3 is set as an origin g321. In the example illustrated in the drawing indicated by reference sign g320, twenty grids (divided areas) are present. In the drawing indicated by reference sign g320, the lines passing through the center of the screen 5 have equal angles between themselves, but the angle may be an angle set in advance depending on the shape or the area of the hall or the shape or the area of the stage 3. For example, the angles of the areas close to the center line g324-5 of the screen 5 may be set to be smaller than the angles of the outer areas of the stage 3, such as the lines g324-1 or g324-9.

A path along which the robot 1B moves when the attention level is changed will be described below.

Figure 31:
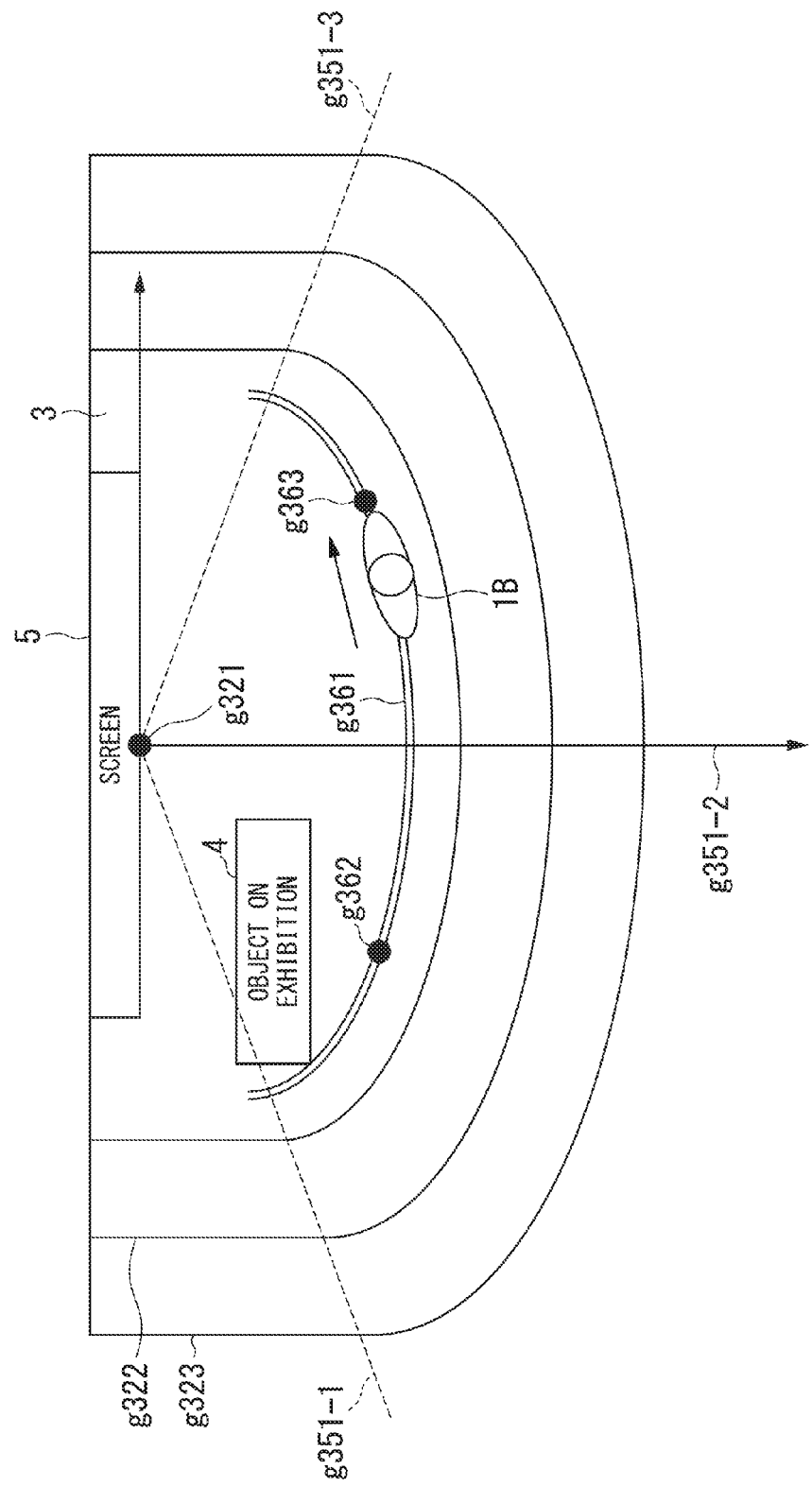
FIG. 31 is a diagram illustrating a moving path of a robot according to the third embodiment.

FIG. 31 is a diagram illustrating a moving path of the robot 1B according to this embodiment. In the example illustrated in FIG. 31, the area is divided as in the drawing indicated by reference sign g320 in FIG. 30. In FIG. 31, the angle is 60 degrees. That is, with respect to the perpendicular line g351-2 passing through the center g321 of the screen 5, the angle of the line g351-1 is −60 degrees, and the angle of the line g351-3 is +60 degrees.

In FIG. 31, the curve g361 denotes the moving path of the robot 1B. As illustrated in FIG. 31, the action planning unit 80B determines the shape of the moving path depending on the shapes of the divided areas. The point g362 is a point on the curve g361 between the lines g351-1 and g351-2 and is a start point or an end point. That is, the point g362 is located at a position making an angle of −30 degrees from the line g351-2. The point g363 is a point on the curve g361 between the lines g351-2 and g351-3 and is a start point or an end point. That is, the point g363 is located at a position making an angle of +30 degrees from the line g351-2.

The action planning unit 80B determines an action plan to move between the points g362 and g363 on the curve g361 when the candidate action is to cause the robot 1B to move closest to the audience. Accordingly, the robot 1B can simply calculate the moving path for changing a watched object and can control its action.

The action planning unit 80B sets the point g362 or g363 included in the area in which the most watched object does not match the focusing point as an end point. Accordingly, the robot 1B can reduce the moving distance for changing the attention level.

The above-described angles are only an example, and the action planning unit 80B may set the angle depending on the divided angles, the arrangement of the object on exhibition 4 on the stage 3, the distribution of persons in the hall, and the like.

The action planning unit 80B may change the moving speed of the robot 1B depending on the ratio of the number of persons present in the divided area watching the most watched object.

For example, since the focusing point is the object on exhibition 4 and only one person of six persons in the first area watches the object on exhibition 4 as illustrated in FIG. 26, the ratio of the number of persons watching the focusing point is about 16.7% which is low. When the ratio for the focusing point is smaller than a predetermined value in this way, the action planning unit 80B may set the speed at which the robot 1B moves from the second area to the first area as illustrated in FIG. 26 to be higher than that when the ratio for the focusing point is larger than the predetermined value. Here, the predetermined value is a value determined in advance by experiment and is, for example, 20%. The action planning unit 80B may set the predetermined value depending on the number of persons present in the area or the scenario.

In the examples illustrated in FIGS. 25, 26, and 29, the number of divided areas is two, but the number of divided areas may be one as described in the first embodiment or three or more.

When the number of divided areas is three or more, the robot 1B compares the focusing point in the divided area with the object most watched by the persons present in the divided area for each divided area through the above-mentioned processes. When neither matches the other, the robot 1B may select a candidate action for redirecting the attention from the object most watched by the persons present in the divided area. As for the plurality of divided areas, the robot 1B may sequentially cause the robot 1B to act to redirect the attention from the object watched by the persons present in the divided area. When the attention levels in all the divided areas are changed, the robot 1B may move along the path extending over all the divided areas.

As described above, the autonomous moving device (for example, the robot 1B) according to this embodiment further includes an area dividing unit (for example, the area dividing unit 25) configured to divide the predetermined area (for example, the area 6) into two or more divided areas (for example, the first area and the second area), an attention state estimating unit (for example, the attention state estimating unit 40) that estimates the first attention state of the person on the basis of information indicating the position and the posture of the person measured by the measuring unit (for example, the sensor 2 or the measuring unit 20) for each divided area, a state analyzing unit (for example, the state analyzing unit 60 or the attention level changing and setting unit 70) that determines the corrective course of action for correcting the first attention state on the basis of the estimated first attention state and the predetermined second attention state for each divided area, and an action planning unit (for example, the action planning unit 80B)

that determines the action corresponding to the determined corrective course of action for each divided area.

According to this configuration, when the attention state of the most persons present in each of the plurality of divided areas is different from the predetermined focusing point predetermined for each divided area, the robot 1 according to this embodiment can change the attention states of the persons present in different areas.

In the autonomous moving device (for example, the robot 1) according to this embodiment, the action planning unit (for example, the action planning unit 80B) sets the divided area as an end point to which the autonomous moving device moves on the basis of the corrective course of action when the divided area in which the first attention state and the second attention state are different from each other is present as the comparison result.

According to this configuration, when the attention state of the most persons present in each of the plurality of divided areas is different from the predetermined focusing point predetermined for each divided area, the robot 1 according to this embodiment can decrease an amount of movement by setting an end point of the movement in different areas.

A program for realizing the functions of the robot (1, 1A, or 1B) according to the present invention may be recorded in a computer-readable recording medium, and the program recorded on the recording medium may be read and executed by a computer system to perform the above-mentioned processes. Here, the "computer system" includes an operating system (OS) or hardware such as peripherals. For example, the "computer system" may include a WWW system having a homepage providing environment (or display environment). Examples of the "computer-readable recording medium" include a portable medium such as a flexible disk, a magneto-optical disc, a read only memory (ROM), and a compact disk (CD)-ROM and a storage device such as a hard disk built in a computer system. The "computer-readable recording medium" may include a medium that holds a program for a predetermined time, like a volatile memory (random access memory (RAM)) in a computer system serving as a server or a client when a program is transmitted via a network such as the Internet or a communication line such as a telephone circuit.

The program may be transmitted from a computer system storing the program in a storage device or the like to another computer system via a transmission medium or by transmission waves in the transmission medium. Here, the "transmission medium" via which the program is transmitted means a medium having a function of transmitting information such as a network (communication network) such as the Internet or a communication circuit (communication line) such as a telephone line. The program may be configured to realize a part of the above-mentioned functions. The program may be a program, that is, a so-called differential file (differential program), capable of realizing the above-mentioned functions by a combination with a program recorded in advance in a computer system.

What is claimed is:

1. An autonomous moving device comprising:
 a measuring unit configured to measure a position and a posture of a person who is present in a predetermined area;
 an attention state estimating unit configured to estimate a first attention state of the person on the basis of information indicating the position and the posture of the person measured by the measuring unit;
 a state analyzing unit configured to determine a corrective course of action for correcting the first attention state on the basis of the estimated first attention state and a predetermined second attention state; and
 an action planning unit configured to determine an action corresponding to the determined corrective course of action,
 wherein
 the attention state estimating unit estimates a gaze direction in which the person present in the predetermined area watches as the first attention state on the basis of the information indicating the posture measured by the measuring unit,
 the second attention state includes a position of a focusing object which is an object which the person is desired to watch and information indicating the focusing object, and
 the attention state estimating unit compares the estimated gaze direction with a focusing direction from the person to the focusing object and determines whether the person watches the focusing object on the basis of the comparison result.

2. The autonomous moving device according to claim 1, wherein when there is a plurality of objects, the attention state estimating unit estimates focusing directions of the person to the plurality of the objects, calculates angle differences between the gaze direction and the focusing directions, and estimates the object corresponding to the focusing direction having the smallest angle difference among the calculated angle differences as the object which the person mostly watches.

3. The autonomous moving device according to claim 2, wherein the attention state estimating unit estimates that the person watches the object when the position of the object corresponding to the focusing direction having the smallest angle difference among the calculated angle differences is within the person's effective viewing angle.

4. The autonomous moving device according to claim 2, wherein the attention state estimating unit estimates the objects watched by a plurality of persons who are present in the predetermined area as the first attention state, and
 the attention state estimating unit calculates a ratio of the persons watching the object among the plurality of persons for each object and estimates the object watched by the plurality of persons who are present in the predetermined area depending on the calculated ratios.

5. The autonomous moving device according to claim 4, wherein the state analyzing unit compares the object estimated by the attention state estimating unit with the focusing object and determines whether a predetermined ratio or more of persons among the plurality of persons who are present in the predetermined area watch the focusing object.

6. The autonomous moving device according to claim 5, wherein the state analyzing unit determines the corrective course of action for correcting the attention state to change the gaze direction when it is determined that the ratio of the persons not watching the focusing object is equal to or greater than the predetermined ratio.

7. The autonomous moving device according to claim 5, wherein the state analyzing unit determines whether to increase the ratio of the persons watching the autonomous moving device or whether to decrease the ratio of the persons watching the autonomous moving device among the plurality of persons who are present in the predetermined area depending on the object watched by the predetermined ratio or more of persons and the focusing object when it is determined that the persons do not watch the focusing object.

8. The autonomous moving device according to claim 7, wherein the state analyzing unit determines whether to change the ratio of the persons watching the focusing object via the autonomous moving device or whether to change the ratio of the persons watching the autonomous moving device which is the focusing object as the corrective course of action depending on the object watched by the predetermined ratio or more of persons and the focusing object when it is determined that the ratio of the persons watching the autonomous moving device is to be increased.

9. The autonomous moving device according to claim 7, wherein the state analyzing unit determines whether to change the ratio of the persons watching the focusing object when the object on which the persons are desired to focus is set or whether to change the ratio of the persons watching the object when the object on which the persons are desired to focus is not set as the corrective course of action depending on the object watched by the predetermined ratio or more of persons and the focusing object when it is determined that the ratio of the persons watching the autonomous moving device is to be decreased.

10. The autonomous moving device according to claim 1, further comprising an action storage unit configured to store candidate actions based on the corrective course of action in advance,
wherein the action planning unit selects one of the candidate actions stored in the action storage unit depending on the corrective course of action determined by the state analyzing unit.

11. The autonomous moving device according to claim 10, wherein the action planning unit preferentially selects the candidate action which does not interfere with a predetermined action of the autonomous moving device.

12. The autonomous moving device according to claim 10, wherein the action planning unit preferentially selects the candidate action which does not accompany movement of the autonomous moving device.

13. The autonomous moving device according to claim 1, further comprising an imaging unit configured to capture an image of the predetermined area,
wherein the measuring unit measures information indicating the gaze directions of the persons who are present in the predetermined area on the basis of the image captured by the imaging unit.

14. An autonomous moving device comprising:
a measuring unit configured to measure a position and a posture of a person who is present in a predetermined area;
an attention state estimating unit configured to estimate a first attention state of the person on the basis of information indicating the position and the posture of the person measured by the measuring unit;
a state analyzing unit configured to determine a corrective course of action for correcting the first attention state on the basis of the estimated first attention state and a predetermined second attention state;
an action planning unit configured to determine an action corresponding to the determined corrective course of action; and
an area dividing unit configured to divide the predetermined area into two or more divided areas,
wherein
the attention state estimating unit estimates the first attention state of the person on the basis of information indicating the position and the posture of the person measured by the measuring unit for each divided area,
the state analyzing unit determines the corrective course of action for correcting the first attention state on the basis of the estimated first attention state and the predetermined second attention state for each divided area, and
the action planning unit determines the action corresponding to the determined corrective course of action for each divided area.

15. The autonomous moving device according to claim 14, wherein the action planning unit sets the divided area as an end point to which the autonomous moving device moves on the basis of the corrective course of action when the divided area in which the first attention state and the second attention state are different from each other is present as the comparison result.

16. A control method of an autonomous moving device, comprising:
measuring a position and a posture of a person who is present in a predetermined area;
estimating, as a first attention state of the person, a gaze direction in which the person present in the predetermined area watches on the basis of information indicating the posture of the person;
comparing the gaze direction with a focusing direction from the person to a focusing object which is an object which the person is desired to watch, and determining whether the person watches the focusing object on the basis of the comparison result;
determining a corrective course of action for correcting the first attention state on the basis of the first attention state and a predetermined second attention state, wherein the second attention state includes a position of the focusing object and information indicating the focusing object; and
determining an action corresponding to the corrective course of action.

* * * * *